United States Patent
Pan et al.

(10) Patent No.: US 12,323,623 B2
(45) Date of Patent: Jun. 3, 2025

(54) COEFFICIENT DECODING METHOD, ELECTRONIC DEVICE AND STORAGE MEDIUM

(71) Applicant: HANGZHOU HIKVISION DIGITAL TECHNOLOGY CO., LTD., Hangzhou (CN)

(72) Inventors: Dongping Pan, Hangzhou (CN); Yucheng Sun, Hangzhou (CN); Xiaoqiang Cao, Hangzhou (CN); Fangdong Chen, Hangzhou (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/730,266

(22) PCT Filed: Jan. 5, 2023

(86) PCT No.: PCT/CN2023/070728
§ 371 (c)(1),
(2) Date: Jul. 18, 2024

(87) PCT Pub. No.: WO2023/138391
PCT Pub. Date: Jul. 27, 2023

(65) Prior Publication Data
US 2025/0119584 A1    Apr. 10, 2025

(30) Foreign Application Priority Data
Jan. 19, 2022   (CN) .......................... 202210062532.2

(51) Int. Cl.
*H04N 11/02* (2006.01)
*H04N 19/129* (2014.01)
(Continued)

(52) U.S. Cl.
CPC ........... *H04N 19/61* (2014.11); *H04N 19/129* (2014.11); *H04N 19/159* (2014.11); *H04N 19/184* (2014.11)

(58) Field of Classification Search
CPC .... H04N 19/61; H04N 19/129; H04N 19/159; H04N 19/184
(Continued)

(56) References Cited

U.S. PATENT DOCUMENTS 5,832,128 A * 11/1998 Suzuki ................... H04N 19/60
382/248
6,484,142 B1 * 11/2002 Miyasaka ............... H03M 7/42
704/201
(Continued)

FOREIGN PATENT DOCUMENTS

| CN | 110650343 A | 1/2020 |
|---|---|---|
| CN | 112995671 A | 6/2021 |
| JP | 2015-005903 A | 1/2015 |

OTHER PUBLICATIONS

International Search Report in International Appln. No. PCT/CN2023/070728, mailed on Jun. 5, 2023, 4 pages (with English translation).
(Continued)

*Primary Examiner* — Jayanti K Patel
*Assistant Examiner* — Richard B Carter
(74) *Attorney, Agent, or Firm* — Fish & Richardson P.C.

(57) ABSTRACT

The embodiments of the present application provide a coefficient decoding method, an electronic device and a storage medium. The method includes: parsing a code stream to obtain coefficient group information of a unit to be decoded, where coefficients of the unit to be decoded are divided into one or more coefficient groups, each of the coefficient groups includes one or more coefficient codes, the coefficient codes in a same coefficient group are fixed-length codes with a same coding length, the coefficient
(Continued)

groups include a first coefficient group, and the coefficient group information includes one or more boundary symbols of the first coefficient group; parsing one or more coefficient codes in the first coefficient group into one or more coefficient values; and determining whether the coefficient values in the first coefficient group are positive or negative according to the boundary symbols

20 Claims, 5 Drawing Sheets

(51) Int. Cl.
*H04N 19/159* (2014.01)
*H04N 19/184* (2014.01)
*H04N 19/61* (2014.01)

(58) Field of Classification Search
USPC ....... 375/240.12, 240.02; 382/248; 358/3.02; 704/E19.044, 201
See application file for complete search history.

(56) References Cited

U.S. PATENT DOCUMENTS

| | | | | |
|---|---|---|---|---|
| 6,798,542 | B1* | 9/2004 | Kimura | H04N 1/32144 |
| | | | | 358/3.02 |
| 11,647,196 | B2 | 5/2023 | Li | |
| 2004/0120404 | A1* | 6/2004 | Sugahara | H04N 19/13 |
| | | | | 704/E19.044 |
| 2015/0358621 | A1* | 12/2015 | He | H04N 19/91 |
| | | | | 375/240.02 |
| 2019/0208225 | A1 | 7/2019 | Chen et al. | |
| 2021/0168369 | A1* | 6/2021 | Li | H04N 19/119 |

OTHER PUBLICATIONS

Notice of Allowance in Taiwanese Appln. No. 112101085, mailed on Feb. 26, 2024, 4 pages (with English translation).

Office Action in Taiwanese Appln. No. 112101085, mailed on Sep. 14, 2023, 13 pages (with English translation).

Zhou, "CE-3.1 and CE-3.2: Transform coefficients range extension for high bit-depth coding," Joint Video Experts Team (JVET) of ITU-T SG 16 WP 3 and ISO/IEC JTC 1/SC 29, JVET-V0047, 22nd Meeting, by teleconference, Apr. 20-28, 2021, 9 pages.

International Search Report in International Appln. No. PCT/CN2023/070728, mailed on Jun. 5, 2023, 4 pages.

Extended European Search Report in European Appln. No. 23742707.5, mailed on Apr. 4, 2025, 10 pages.

Lee et al., "Towards MPEG4: An improved H.263-based video coder," Signal Processing: Image Communication, Jul. 1997, 10(1-3):143-158.

Zhou et al., "A 530 Mpixels/s 4096x2160@60fps H.264/AVC High Profile Video Decoder Chip," IEEE Journal of Solid-State Circuits, Apr. 2011, 46(4):777-788.

Zhou et al., "Reducing Power Consumption of HEVC Codec with Lossless Reference Frame Recompression," Paper, Presented at the 2014 IEEE International Conference on Image Processing (ICIP), Paris, France, Oct. 27-30, 2014; IEEE, Jan. 29, 2015, pp. 2120-2124.

* cited by examiner (a) Divide into three groups (b) Divide into five groups

COEFFICIENT DECODING METHOD, ELECTRONIC DEVICE AND STORAGE MEDIUM

CROSS REFERENCE TO RELATED APPLICATIONS

This application is a U.S. National Stage of International Application No. PCT/CN2023/070728 filed on Jan. 5, 2023, which claims priority to Chinese Patent Applications No. 202210062532.2, filed on Jan. 19, 2022, the disclosure of which is incorporated herein by reference in its entirety for all purposes.

TECHNICAL FIELD

Embodiments of the present disclosure relates to the field of image coding and decoding technologies, and in particular to a coefficient decoding method and apparatus, an image decoder and an electronic device.

BACKGROUND

Lossless compression refers to a technology of compressing redundant information in an original image and reconstructing the original image without causing any distortion. If there is an error between the reconstructed image and the original image, and the error is limited in a certain range, it may be referred to as near lossless compression. In the process of the compression coding, residual values between pixels in the original image are predicted, and the residual values are used to indicate differences between the pixels. Semi fixed-length code is used to encode the residual values to further reduce a coding length. However, existing semi fixed-length code technologies still have problems of long coding length and low code efficiency.

SUMMARY

Embodiments of the present disclosure provide a coefficient decoding method and apparatus, an image decoder and an electronic device, which can improve image decoding performance.

In order to achieve the above purpose, the embodiments of the present disclosure adopt the following technical solutions.

In a first aspect, the embodiments of the present disclosure provide a coefficient decoding method, including: parsing a code stream to obtain coefficient group information of a unit to be decoded, wherein coefficients of the unit to be decoded are divided into one or more coefficient groups, each of the coefficient groups includes one or more coefficient codes, the coefficient codes in a same coefficient group are fixed-length codes with a same coding length, the coefficient groups include a first coefficient group, and the coefficient group information includes one or more boundary symbols of the first coefficient group; parsing one or more coefficient codes in the first coefficient group into one or more coefficient values; and determining whether the coefficient values in the first coefficient group are positive or negative according to the boundary symbols.

In the coefficient decoding method provided by the embodiments of the present disclosure, compared with the related art, a decoding range of the fixed-length codes without introducing the boundary symbols is $[0, 2^{\wedge}\text{bit\_depth}-1]$; in the case that the boundary symbols are introduced to perform a fixed-length decode on the coefficient codes in the coefficient group, it can be determined whether the coefficient group is positive or negative according to the boundary symbols of the coefficient group, and an analytical range of the fixed-length codes is changed from $[0, 2^{\wedge}\text{bit\_depth}-1]$ to $[-2^{\wedge}(\text{coding length}-1)-1, 2^{\wedge}(\text{coding length}-1)]$, without increasing the coding length corresponding to the coefficient group when the coefficient values in the coefficient group are equal to $2^{\wedge}\text{bit\_depth}-1$, thereby improving the coding and decoding efficiency.

In a possible implementation, the coefficient group information further includes a coding length and an image bit width of the first coefficient group, the coding length is used to represent a length of fixed-length codes corresponding to the first coefficient group, and parsing one or more coefficient codes in the first coefficient group into one or more coefficient values includes: in response to the coding length being greater than or equal to the image bit width, parsing the coefficient codes in the first coefficient group into the coefficient values by using fixed-length codes with a length equal to the image bit width; and in response to the coding length being smaller than the image bit width, parsing the coefficient codes in the first coefficient group into the coefficient values by using fixed-length codes with a length equal to the coding length.

The image bit width corresponding to the coefficient group is used to represent a range of the coefficient values in the coefficient group. According to the fixed-length codes with a preset coding length corresponding to the coefficient group and the analytical range of coefficient values in the coefficient group, the fixed-length codes corresponding to the coefficient group and the analytical range of coefficient values can be determined, thereby ensuring the accuracy of the determination method. The image bit width corresponding to the coefficient group can be obtained by parsing the code stream, which can simply and quickly extract required data for determination, thereby improving the determination efficiency. By using fixed-length codes with different coding lengths to parse the coefficient codes based on two different situations, the decoding efficiency can be improved.

In a possible implementation, the coding length of the coefficient group includes a coefficient group coding length and a coefficient bit coding length. The coefficient bit coding length is used to represent a length of fixed-length codes corresponding to one or more coefficient codes at one or more specific positions in the first coefficient group, where each of the specific positions is obtained according to the coding and decoding consistency or derived from the context. Parsing the coefficient codes n the first coefficient group into the coefficient values by using fixed-length codes with a length of the coding length includes: parsing the coefficient codes at the specific positions in the first coefficient group into coefficient values by using fixed-length codes with a length of the coefficient bit coding length; and parsing coefficient codes in the first coefficient group except the specific positions into coefficient values by using fixed-length codes with a length of the coefficient group coding length. When the coefficient distribution is uneven, for coefficient codes at some specific positions, coefficient codes in the same coefficient group are parsed by using fixed-length codes of different lengths, so as to avoid increasing the overall coding length of the coefficient group due to a relatively large difference between coefficient codes at a few specific positions with coefficient codes at other positions in the coefficient group, and improve the decoding efficiency.

In a possible implementation, coefficient codes with the same or similar coding lengths will be put into the same coefficient group according to the size of the coefficient values during code sorting. Therefore, when coefficient values in the same coefficient group have an analytical extremum of a fixed-length code corresponding to the coding length, other coefficient values and the analytical extremum in the same coefficient group are both positive or negative. Therefore, when there is an absolute extremum in the first coefficient group, it is determined that all coefficient values in the coefficient group are all positive or all negative according to the boundary symbols, where the absolute extremum is the largest absolute value of a code value range of the fixed-length code corresponding to the coding length of the coefficient group. The same coefficient group uses a boundary symbol to represent whether the coefficients are positive or negative, which improves the coding efficiency.

In a possible implementation, the same coefficient group is divide into a plurality of coefficient blocks, when there is an absolute extremum in any coefficient block of the plurality of coefficient blocks, it is determined that all coefficient values in any coefficient block are all positive or all negative according to the boundary symbol of any coefficient block. Therefore, the indication accuracy of the positive and negative coefficient values based on the boundary symbols is further improved.

In a possible implementation, during the coding process, if one or more predicted values and one or more residual values are quantized, compared with quantizing the predicted values and the residual values after performing coefficient transform, there are the same or better image transmission quality ag and decoding, efficiency. Therefore, the predicted values and the residual values are quantized to obtain a residual coefficient without performing coefficient transform.

Therefore, the coefficient codes in the unit to be decoded obtained by parsing the code stream through the decoding device may be the semi fixed-length code result of the residual coefficients or the semi fixed-length code result of the transform coefficients. The coefficient decoding method in any of the above implementations can be applied to the decoding of the residual coefficients or the transform coefficients, thereby improving the applicability of the coefficient decoding method.

In a possible implementation, a direct current (DC) coefficient group and an alternating current (AC) coefficient group included in the transform coefficients are divided into different coefficient groups respectively. The coding length of each of the coefficient groups is in a form of a coding length code in the coefficient group information, and the boundary symbols are in a form of a boundary symbol code in the coefficient group information. In the case that coefficients in the coefficient group are the transform coefficients and the coefficient group is the DC coefficient group, the coding length code is parsed by using a DC coefficient decoding method (for example, a fixed-length code) to obtain the coding length corresponding to the coefficient group; and the boundary symbol code of the coefficient group is parsed by using a fixed-length code of the coding length corresponding to the coefficient group to obtain the boundary symbols. In another example, in the case that the coefficients in the coefficient group are the transform coefficients and the coefficient group is the DC coefficient group, a coding length code can be parsed by using the fixed-length code to obtain the coding length corresponding to the coefficient group; a DC coefficient value can be parsed by using a fixed-length code of the coding length corresponding to the coefficient group and the boundary symbol code of the coefficient group can be parsed by using a fixed coding length of 1 to obtain the boundary symbols In a possible implementation, in the case that coefficients in the coefficient group are the transform coefficients and the coefficient group is the AC coefficient group, the coding length code corresponding to the coefficient group is parsed by using a fixed-length decoding method to obtain the coding length corresponding to the coefficient group; and the boundary symbol of the coefficient group is parsed by using the fixed-length code of the coding length corresponding to the coefficient group to obtain the boundary symbols.

Since DC coefficients and AC coefficients will be generated when coefficient transform is performed between the residual values with the predicted values, in the case that the DC coefficients and the AC coefficients are divided into coefficient groups respectively, the coding length code of the DC coefficient group is parsed by using the DC coefficient decoding method, and the coding length code of the AC coefficient group is parsed by using the fixed-length decoding method, coefficient coding and decoding can be performed on the DC coefficients and the AC coefficients respectively, thereby avoiding the problem that the difference of the coefficient values in the same coefficient group is relatively large and it is necessary to use fixed-length codes with a relatively long coding length to code and parse, and improving the decoding efficiency.

In a possible implementation, determine the first coefficient group in the unit to be decoded includes: determining a scanning manner and a grouping manner of the unit to be decoded from the code stream; scanning the unit to be decoded according to the scanning manner to obtain one or more scanning results; and dividing the scanning results into one or more coefficient groups according to the grouping manner, wherein the first coefficient group is any one of the one or more coefficient groups.

In the process of coding and decoding, decoding can be an inverse step of coding, and the scanning manner, the grouping manner, the fixed-length code, and the like used by an coder end are consistent with that agreed by a decoder end in advance, and follow the coding and decoding consistency. In semi fixed-length code, the residual coefficients or the transform coefficients are sorted and grouped by a scanning manner and a grouping manner, and the coefficient values encoded by fixed-length codes with different coding lengths are set to different groups; then the scanning manner and the grouping manner are transmitted to a decoding device through the code stream; and the decoding device uses fixed-length codes with the same coding length according to the coefficient groups determined by the scanning manner and grouping manner, thereby ensuring the coding and decoding consistency, and further ensuring the coding and decoding accuracy.

In a possible implementation, the coefficient group information includes a coding length threshold and a coefficient added value of each of the coefficient groups. In the case that a coding length corresponding to the coefficient group is greater than the coding length threshold of the coefficient group, after obtaining one or more coefficient values through the fixed-length decoding method, the method further includes: adding the coefficient values with the coefficient added value of the coefficient group to obtain the coefficient values of the coefficient group.

The decoding device determines whether all the coefficient values in the coefficient group are subtracted from the same coefficient added value when coding based on the coding length threshold, and thus the coefficient added value can be added after decoding the values in the coefficient group at the decoding end to restore the coefficient values in the coefficient group. The coding device transmits a preset average value to the decoding device, and the decoding device restores the coefficient values based on the coefficient added value, thereby avoiding the transmission of long codes corresponding to original relatively large coefficient values in the coefficient group and improving the coding and decoding efficiency.

In a possible implementation, in addition to a sign bit used to represent a positive or negative extremum, the coefficient group information may further include a coefficient compensation value of each of the coefficient groups. The coefficient compensation value is used to compensate for one or more extremums in the coefficient group. After determining whether the coefficient values in the first coefficient group are positive or negative according to the boundary symbols, the method further includes: adding an absolute extremum in the coefficient values with the coefficient compensation value to obtain a coefficient value at an absolute extremum position M the coefficient group. By using a relatively short coding length, an analytical range of a sum of the extremum plus the coefficient compensation value is obtained, thereby improving the coding and decoding efficiency.

In a possible implementation, the coefficient group is divided into a plurality of coefficient blocks, and the coefficient compensation value of the coefficient group includes coefficient compensation values of all coefficient blocks in the coefficient group. After determining whether the coefficient values in the first coefficient group are positive or negative according to the boundary symbols, the method further includes: adding an absolute extremum in each of the coefficient blocks with the coefficient compensation value in the same coefficient block to obtain a coefficient value at an absolute extremum position in the coefficient block. By using the coefficient compensation value, the extremum in the coefficient block can be compensated, thereby further improving the coding efficiency.

In a second aspect, the embodiments of the present disclosure provide a coefficient decoding method, including: parsing a code stream to obtain coefficient group information of a unit to be decoded, wherein coefficients of the unit to be decoded are divided into one or more coefficient groups, each of the coefficient groups includes one or more coefficient codes, the coefficient codes in a same coefficient group are fixed-length codes with a same coding length, the coefficient groups include a first coefficient group, the coefficient group information includes one or more boundary symbols, a coding length and an image bit width of the first coefficient group, and the coding length is configured to represent a length of fixed-length codes corresponding to the first coefficient group; parsing one or more coefficient codes in the first coefficient group into one or more coefficient values; wherein in response to the coding length being greater than or equal to the image bit width, parsing the coefficient codes in the first coefficient group into the coefficient values by using fixed-length codes with a length equal to the image bit width; and in response to the coding length being smaller than the image bit width, parsing the coefficient codes in the first coefficient group into the coefficient values by using fixed-length codes with a length equal to the coding length; and determining whether the coefficient values in the first coefficient group are positive or negative according to the boundary symbols.

In a possible implementation, determining whether the coefficient values in the first coefficient group are positive or negative according to the boundary symbols includes: in response to an absolute extremum being in the first coefficient group, determining that symbols of coefficient values in the first coefficient group whose absolute values are equal to coefficients of the absolute extremum are all positive or all negative according to the boundary symbols, wherein the absolute extremum is the largest absolute value of a fixed-length code value range of the coding length.

In a possible implementation, the first coefficient group includes one or more coefficient blocks, and determining whether the coefficient values in the first coefficient group are positive or negative according to the boundary symbols includes: f-r any one of the coefficient blocks, in response to an absolute extremum being in the coefficient block, determining that symbols of coefficient values in the coefficient block whose absolute values are equal to coefficients of the absolute extremum are all positive or all negative according to the boundary symbol of the coefficient block.

In a possible implementation, coefficients in the first coefficient group are residual coefficients, transform coefficients, or original pixel values.

In a possible implementation, the method further includes: parsing the code stream by using a fixed coding length of 1 to obtain the boundary symbols.

In a third aspect, the embodiments of the present disclosure provide a coefficient decoding method, including: parsing a code stream to obtain coefficient group information of a unit to be decoded, a grouping manner of the unit to be decoded, and a prediction mode of the unit to be decoded; wherein coefficients of the unit to be decoded are divided into one or more coefficient groups, each of the coefficient groups includes one or more coefficient codes, the coefficient codes in a same coefficient group are fixed-length codes with a same coding length, the coefficient groups include a first coefficient group, and the coefficient group information includes one or more boundary symbols of the first coefficient group; deriving a scanning manner according to the prediction mode, scanning the unit to be decoded according to the scanning manner to obtain one or more scanning results, and extracting the first coefficient group from the scanning results according to the grouping manner; wherein if the prediction mode is a point-by-point prediction mode, the scanning manner is a scanning manner with vertical priority, wherein the scanning manner with vertical priority is a scanning manner from top to bottom and then from left to right; parsing one or more coefficient codes in the first coefficient group into one or more coefficient values; and determining whether the coefficient values in the first coefficient group are positive or negative according to the boundary symbols.

In a possible implementation, determining whether the coefficient values in the first coefficient group are positive or negative according to the boundary symbols includes: in response to an absolute extremum being in the first coefficient group, determining that symbols of coefficient values in the first coefficient group whose absolute values are equal to coefficients of the absolute extremum are all positive or all negative according, to the boundary symbols, wherein the absolute extremum is the largest absolute value of a fixed-length code value range of the coding length.

In a possible implementation, the first coefficient group includes one or more coefficient blocks, an d determining whether the coefficient values in the first coefficient group are positive or negative according to the boundary symbols includes: fir any one of the coefficient blocks, in response to an absolute extremum being in the coefficient block, determining that symbols of coefficient values in the coefficient block whose absolute values are equal to coefficients of the absolute extremum are all positive or all negative according to the boundary symbol of the coefficient block.

In a possible implementation, coefficients in the first coefficient group are residual coefficients, transform coefficients, or original pixel values.

In a possible implementation, the method further includes: parsing the code stream by using a fixed coding length of 1 to obtain the boundary symbols.

In a fourth aspect, the embodiments of the present disclosure provide a coefficient decoding apparatus, including a parsing module and a decoding module. The parsing module is configured to parse a code stream to obtain coefficient group information of a unit to be decoded, wherein coefficients of the unit to be decoded are divided into one or more coefficient groups, each of the coefficient groups includes one or more coefficient codes, the coefficient codes in a same coefficient group are fixed-length codes with a same coding length, the coefficient groups include a first coefficient group, and the coefficient group information includes one or more boundary symbols of the first coefficient group. The decoding module is configured to parse one or more coefficient codes in the first coefficient group into one or more coefficient values, and is further configured to determine Whether the coefficient values in the first coefficient group are positive or negative according to the boundary symbols.

In a fifth aspect, the embodiments of the present disclosure provide coefficient a decoding apparatus, including: a parsing module configured to parse a code stream to obtain coefficient group information of a unit to be decoded, wherein coefficients of the unit to be decoded are divided into one or more coefficient groups, each of the coefficient groups comprises one or more coefficient codes, the coefficient codes in a same coefficient group are fixed-length codes with a same coding length, the coefficient groups comprise a first coefficient group, the coefficient group information comprises one or more boundary symbols, a coding length and an image bit width of the first coefficient group, and the coding length is configured to represent a length of fixed-length codes corresponding to the first coefficient group; and a decoding module configured to parse one or more coefficient codes in the first coefficient group into one or more coefficient values; wherein in response to the coding length being greater than or equal to the image bit width, parse the coefficient codes in the first coefficient group into the coefficient values by using fixed-length codes with a length equal to the image bit width; and in response to the coding length being smaller than the image bit width, parse the coefficient codes in the first coefficient group into the coefficient values by using fixed-length codes with a length equal to the coding length. The decoding module is further configured to determine whether the coefficient values in the first coefficient group are positive or negative according to the boundary symbols.

In a sixth aspect, the embodiments of the present disclosure provide a coefficient decoding apparatus, including: a parsing module configured to parse a code stream to obtain coefficient group information of a unit to be decoded, a grouping manner of the unit to be decoded, and a prediction mode of the unit to be decoded; wherein coefficients of the unit to be decoded are divided into one or more coefficient groups, each of the coefficient groups comprises one or more coefficient codes, the coefficient codes in a same coefficient group are fixed-length codes with a same coding length, the coefficient groups comprise a first coefficient group, and the coefficient group information comprises one or more boundary symbols of the first coefficient group; derive a scanning manner according to the prediction mode, scan the unit to be decoded according to the scanning manner to obtain one or more scanning results, and extract the first coefficient group from the scanning results according to the grouping manner; wherein if the prediction mode is a point-by-point prediction mode, the scanning manner is a scanning manner with vertical priority, wherein the scanning manner with vertical priority is a scanning manner from top to bottom and then from left to right; and a decoding module configured to parse one or more coefficient codes in the first coefficient group into one or more coefficient values. The decoding module is further configured to determine whether the coefficient values in the first coefficient group are positive or negative according to the boundary symbols.

In a seventh aspect, the embodiments of the present disclosure provide an image decoder for-performing the coefficient decoding method described in any one of the first aspect, the second aspect, the third aspect and their possible implementations.

In an eighth aspect, the embodiments of the present disclosure provide an electronic device, including an image decoder, a communication interface and a memory. The image decoder is configured to perform the coefficient decoding method described in any one of the first aspect, the second aspect, the third aspect and their possible implementations.

In a ninth aspect, the embodiments of the present disclosure provide a computer-readable storage medium including computer instructions, wherein when the computer instructions are run on an electronic device, the electronic device is enabled to perform the coefficient decoding method described in any one of the first aspect, the second aspect, the third aspect and their possible implementations.

In tenth aspect, the embodiments of the present disclosure provide a computer program product, wherein the computer program product, when running on a computer, performs the coefficient decoding method described in any one of the first aspect, the second aspect, the third aspect and their possible implementations.

In a eleventh aspect, the embodiments of the present disclosure provide an apparatus, including a memory and a processor. The memory is configured to store computer instructions. The processor is configured to call and run the computer instructions from the memory to cause the electronic device to perform the coefficient decoding method described in any one of the first aspect, the second aspect, the third aspect and their possible implementations.

In twelfth aspect, the embodiments of the present disclosure provide an image coding and decoding system, including an image coding device and an image decoding device. The image decoding device is configured to receive an image code stream from the image coding device, and perform the coefficient decoding method described in any one of the first aspect, the second aspect, the third aspect and their possible implementations to perform coefficient decoding on the image code stream; perform image reconstruction according to a coefficient decoding result to obtain a decoded image.

It should be understood that beneficial effects obtained by the technical solutions of the second aspect to the twelfth aspect and corresponding possible implementations of the embodiment of the present disclosure can refer to technical effects of the first aspect, the second aspect, the third aspect and its corresponding, possible implementations, which will not be repeated here.

DETAILED DESCRIPTION OF THE EMBODIMENTS

Figure 1:
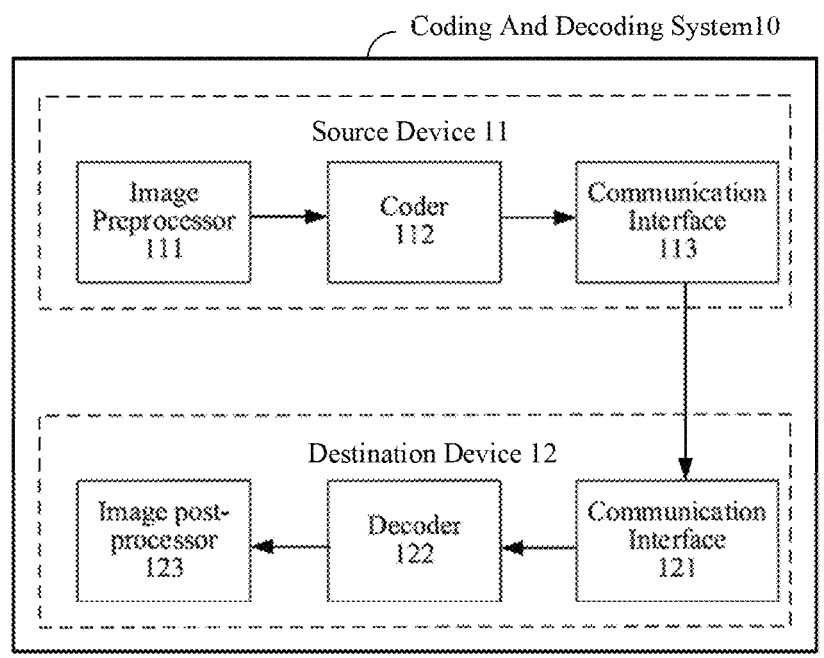
FIG. 1 is a schematic diagram of an architecture of an coding and decoding system according to an embodiment of the present disclosure.

The term "and/or" in this specification describes only an association relationship for describing associated objects and represents that three relationships may exist. For example, A and/or B may represent the following three cases: only A exists, both A and B exist, and only B exists.

In the specification and claims in embodiments of the present disclosure, the terms "first", "second", and the like are intended to distinguish between different objects, but do not describe a specific order of the objects. For example, a first prediction mode and a second prediction mode are used to distinguish between different prediction modes, but are not used to describe a particular order of prediction modes.

In the embodiments of the present disclosure, the term "example" or "for example" is used to represent an example, an illustration, or a description. Any embodiment or design solution described as an "example" or "for example" in the embodiments of the present disclosure should not be construed as being more preferred or having more advantages than another embodiment or design solution. Exactly, use of the term "example" or "for example" or the like is intended to present a relative concept in a specific manner.

In the descriptions of the embodiments of the present disclosure, unless otherwise stated, "a plurality of" means two or more. For example, a plurality of prediction units refer to two or more prediction units, and a plurality of coding blocks refer to two or more coding blocks.

The coefficient decoding method according to the embodiments of the present disclosure can also be used for video decoding, image decoding, and the like. It should be understood that the coefficient decoding method provided by the present disclosure is applicable as long as there is an coding method of performing semi fixed-length code on predicted values, residual values, or coefficient values.

Hereinafter, the existing image coding and decoding techniques and semi fixed-length code techniques will be explained.

Taking a joint photographic experts group (JPEG) image compression method as an example, the image is first converted from a red-green-blue (RGB) format to a YUV (Y represents luminance, U and V represent chrominance) format. Then, an image in the YUV format is sampled according to a certain sampling format, and the image is divided into multiple data blocks. Since three components (Y, U and V) of each point in a source image appears alternately, it is necessary to separate the three components and store them in three tables. When coding, after reading a data block from source data, discrete cosine transform (DCT), quantization and encoding are performed on the data block, and then read and process the next data block. Encoding can include binarization and entropy coding steps, where binarization is also referred to as binary switch, symbols or coefficients to be encoded are binarized, and the binarized symbols or coefficients are converted into binary strings. Binary strings obtained by encoding the same coefficients with different binarization methods may have different binary probability models and different string lengths. The entropy encoding refers to performing lossless coding according to the principle of information entropy, which converts a series of element symbols used to represent a video sequence into one binary code stream for transmission or storage. The output data after entropy coding is the final code stream after the original image is compressed. The DCT transform is to transform an image from a time domain signal to a frequency domain. Since the energy of most images is mainly concentrated in a low frequency region, and human eyes are more sensitive to low frequency, a dynamic range of image coding can be reduced on the basis of a transform module by zeroing a high frequency coefficient through quantization. Transform coefficients in the high-frequency region are removed, the overhead of code rate is reduced, and relatively large distortion will not be caused. The residual values are composed into the residual blocks, and the coefficients of the residual blocks after transformation and quantization are referred to as transform coefficients.

It should be understood that the processes of coding and decoding are inverse, for example, when coding, color gamut conversion, sampling, DCT transform, quantization and coding are sequentially performed on the image, while when decoding, decoding, inverse quantization and inverse discrete cosine transform (IDCT) are sequentially performed on the received code stream, then the results of the inverse discrete cosine transform are arranged in an inverse sampling order, and finally, the image data is converted from the YUV format back to the RGB format.

In lossless and near lossless video compression algorithms, for example, when coding using a JPEG image compression method, the quantized data is often coded by using a semi fixed-length code method after performing the quantization step. The coefficients to be coded are grouped according to the prediction direction and the residual size, each group corresponds to a coding length code, and the coefficients in the same group are coded by using the fixed-length codes with the same coding length.

For example, if data obtained by quantizing a data block includes (−4, 4, −3, −2, −1, 0, 1, 2, 3, 7), the data can be divided into (−1, 0, 1), −3, −2, 2, 3) and (−4, −4, 7). The coding length of the coding length code corresponding to (−1, 0, 1) is 2, the coding length of the coding length code corresponding to (−3, −2, 2, 3) is 3, and the coding length of the coding length code corresponding to (−4, −4, 7) is 4. Alternatively, the coding length of the coding length code corresponding to (−1, 0, 1) is 1, the coding length of the coding length code corresponding to (−3, −2, 2, 3) is 2, and the coding length of the coding length code corresponding to (−4, −4, 7) is 3, and then the symbols of each data are coded by using the coding length of 1 or the symbols of each non-zero data are coded by using the coding length of 1.

Fixed-length code grouping is performed on the quantized intra-group data with a fixed-length by using the existing semi fixed-length code. Although lossless coding can be performed to a certain extent, when there is an extremum of the analytical range of the fixed-length code of a certain coding length in a group corresponding to the coding length, it is necessary to increase all the coding lengths of the coefficient group, the coding length of such code are still relatively large. In order to further improve the coding performance, the embodiments of the present disclosure provide a coefficient decoding method.

Hereinafter, a system architecture to which the coefficient decoding method of an embodiment of the present disclosure is applied will be described. Referring to FIG. 1, there is provided a schematic diagram of an architecture of a coding and decoding system also referred to as an encoding and decoding system) 10 applied in an embodiment of the present disclosure. As shown in FIG. 1, the coding and decoding system 10 can include a source device 11 and a destination device 12. The source device 11 is used to code an image, and thus the source device 11 may be referred to as a video coding device. The destination device 12 is used to decode the coded image data generated by the source device 11, and thus the destination device 12 may be referred to as a video decoding device.

The source device 11 and the destination device 12 can include various apparatuses, including, for example, desktop computers, mobile computing devices, notebook computers (for example, laptop computers), tablet computers, set-top boxes, mobile phones, televisions, cameras, display apparatuses, digital media players, video game consoles, vehicle-mounted computers, wireless communication devices, and the like.

In an example, the source device 11 and destination device 12 in FIG. 1 can be two separate devices, or the source device 11 and destination device 12 can be the same device, that is, the source device 11 or corresponding functions thereof and the destination device 12 or corresponding functions thereof can be integrated on the same device.

Communication can be performed between the source device 11 and the destination device 12. For example, the destination device 12 can receive coded image data from the source device 11. In an example, one or more communication media may be included between the source device 11 and the destination device 12, and the coded image data can be transmitted through the one or more commutation media. The one or more communication media may include routers, switches, base stations, or other devices that facilitate communication from the source device 11 to the destination device 12.

As shown in FIG. 1, the source device 11 includes a coder 112. In an example, the source device 11 may further include an image preprocessor 111 and a communication interface 113. The image preprocessor 111 is used to perform preprocessing on the received image to be encoded. For example, the preprocessing performed by the image preprocessor 111 may include retouching, color format conversion (for example, from RGB format to YUV format), retouching or denoising, and the like. The coder 112 is used to receive the preprocessed image and process the preprocessed image by using a relevant prediction mode (for example, the prediction mode in various embodiments herein) to provide the coded image data. In some embodiments, the coder 112 may be used to perform image coding processes in various embodiments described below. The communication interface 113 can be used to transmit the coded image data to the destination device 12 or any other device (for example, a memory) for storage or direct reconstruction, and other devices can be any device used for decoding or storage. The communication interface 113 can also encapsulate the coded image data into a suitable format before transmitting.

In an example, the image preprocessor 111, the coder 112 and the communication interface 113 described above may be hardware components in the source device 11, or software programs in the source device 11, which is not limited in the embodiment of the present disclosure.

As shown in FIG. 1, the destination device 12 includes a decoder 122. In an example, the destination device 12 may further include a communication interface 121 and an image post-processor 123. The communication interface 121 can be used to receive the coded image data from the source device 11 or any other source device such as a storage device. The communication interface 121 can also decapsulate the data transmitted by the communication interface 113 to obtain the coded image data. The decoder 122 is used to receive the coded image data and output decoded image data (also referred to as reconstructed image data or image data having be reconstructed). In some embodiments, the decoder 122 may be used to perform the coefficient decoding process described in the following embodiments.

The image post-processor 123 is used to perform post-processing on the decoded image data to obtain post-processed image data. The post-processing performed by the image post-processor 123 may include color format conversion (for example, from YUV format to RGB format), color adjustment, retouching or resampling, or any other processing, and may also be used to transmit the post-processed image data to a display device for display.

Similarly, in an example, the communication interface 121, the decoder 122 and the image post-processor 123 described above may be hardware components or software programs in the destination device 12, which is not limited in the embodiment of the present disclosure.

Hereinafter, the structures of the coder and decoder in FIG. 1 are briefly introduced.

Figure 2:
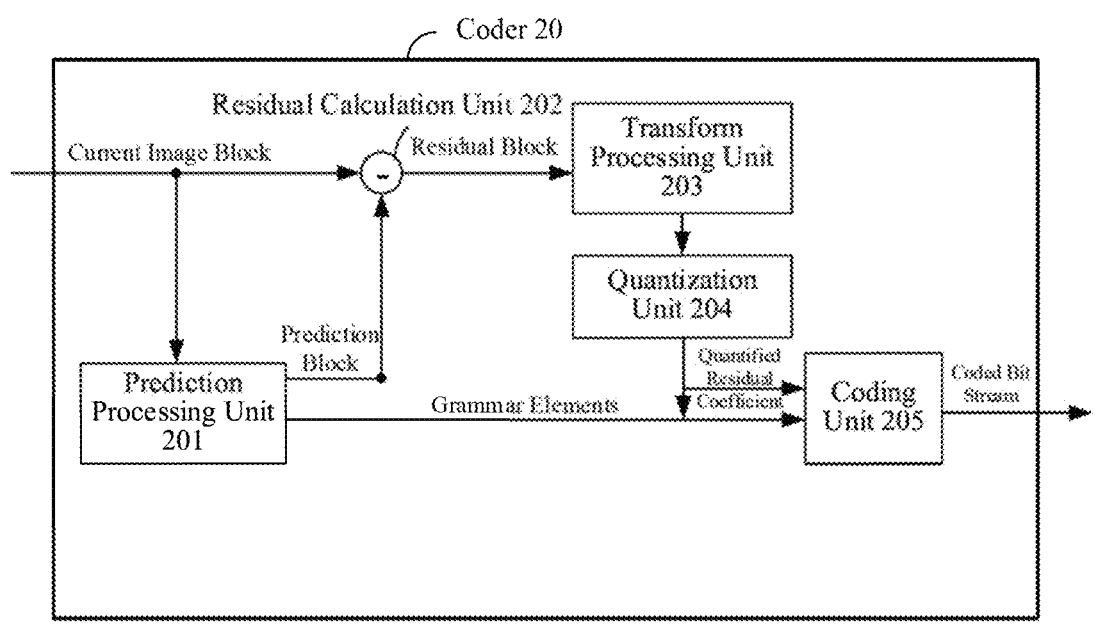
FIG. 2 is a schematic block diagram of an coder according to an embodiment of the present disclosure.

Referring to FIG. 2, FIG. illustrates a schematic block diagram of an example of a coder 20 for implementing an embodiment of the present disclosure. In FIG. 2, the coder includes a prediction processing unit 201, a residual calculation unit 202, a transform processing unit 203, a quantization unit 204 and a coding unit 205. In an example, the coder further includes an inverse quantization unit (also referred to as a reverse quantization unit), an inverse transform processing unit (also referred to as a reverse transform processing unit), a reconstruction unit (or referred to as a reconfiguration unit), and a filter unit. In an example, the coder 20 may further include a buffer and a decoded image buffer. The buffer is used to buffer reconstructed image blocks output by the reconstruction unit, and the decoded image buffer is used to buffer filtered image blocks output by the filter unit.

An input of the coder 20 is an image block of an image (which may be referred to as the image to be coded), and the image block may also be referred to as a current image block or the image block to be coded. The coder 20 may further include a dividing unit (not shown in FIG. 2) for dividing the image to be coded into a plurality of image blocks. The coder 20 is used to code the image to be coded block by block, for example, the coding process is performed on each of the image blocks.

The prediction processing unit 201 is configured to receive or obtain an image block (a current image block to be coded of the current image to be coded, which may be referred to as a current image block, and the current image block can be understood as a true value of the image block) and the reconstructed image data, and predict the current image block based on relevant data in the reconstructed image data to obtain a prediction block of the current image block.

The residual calculation unit 202 is configured to calculate a residual between the true value of the image block and the prediction block of the image block to obtain a residual block. For example, by subtracting a pixel value of the prediction block from a pixel value of the image block pixel by pixel.

The transform processing unit 203 is configured to perform coefficient transform (for example, discrete cosine transform and discrete sine transform (DST)) on the residual block to obtain transform coefficients in a transform domain. It should be understood that in the embodiment, the transform processing unit 203 can perform coefficient transform on the residual block, or may not perform coefficient transform on the residual block when a coding efficiency difference between the residual block and the transform coefficient is relatively small.

The quantization unit 204 is configured to quantize the transform coefficients by applying scalar quantization or vector quantization to obtain quantized transform coefficients. The quantized transform coefficients may be referred to as quantized residual coefficients. The quantization process can reduce a bit_depth associated with some or all of the transform coefficients. For example, n-bit transform coefficients may be rounded down to in-bit transform coefficients during quantization, where n is greater than m. By adjusting quantization parameters (QP), the quantization degree can be modified. For example, for scalar quantization, different scales can be applied to achieve relatively fine or coarse quantization. A relatively small quantization step corresponds to a relatively fine quantization, while a relatively large quantization step corresponds to a relatively coarse quantization. Appropriate quantization step size can be indicated based on the quantization parameters.

The coding unit 205 is configured to code the quantized residual coefficients or the transform coefficients described above, then arrange the coefficient codes into units to be decoded in a scanning manner and a grouping manner, and output the coded image data (that is, the units to be decoded) in a form of a coded bit stream. Then, the coded bit stream can be transmitted to the decoder or stored, and subsequently transmitted to the decoder or used for retrieval. The coding unit 205 can also be configured to code other syntax elements of the current image block, for example, code the prediction mode into a code stream. Optionally, in the embodiment, the coefficients can be coded using, one of unary code, truncated unary code, truncated binary code, fixed-length code, semi fixed-length code, run-length coding, k-order exponential Golomb coding, truncated Rice coding, Golomb-Rice coding, Huffman coding, arithmetic coding, adaptive variable length coding, and the like, or b combining a plurality of coding methods.

Specifically, in the embodiment of the present disclosure, the coder 20 is used to implement the image coding method described in the following embodiments.

Figure 3:
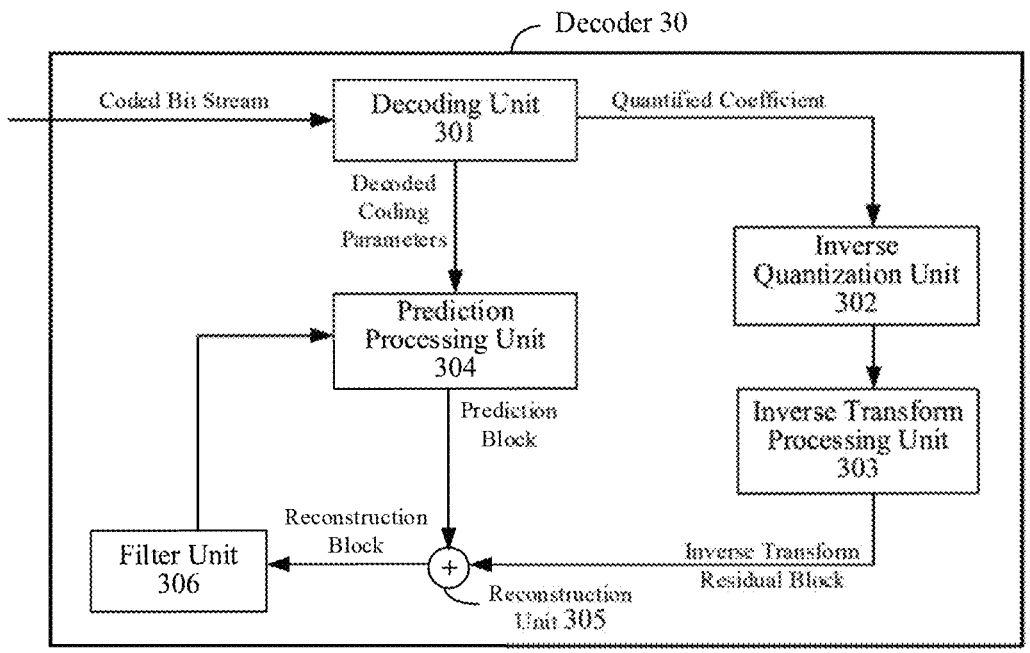
FIG. 3 is a schematic block diagram of a decoder according to an embodiment of the present disclosure.

Referring to FIG. 3, FIG. 3 illustrates a schematic block diagram of an example of a decoder 30 for implementing an embodiment of the present disclosure. The decoder 30 is used to receive, for example, coded image data (that is, a coded bit stream, for example, a coded bit stream including image blocks and associated syntax elements) coded by the coder 20 to obtain a decoded image. The decoder 30 includes a decoding unit 301, an inverse quantization unit 302, an inverse transform processing unit 303, a prediction processing unit 304, a reconstruction unit 305 and a filter unit 306. In some examples, the decoder 30 may perform a decoding pass that is substantially reciprocal to the coding pass described by the coder 20 in FIG. 2. In an example, the decoder 30 may further include a buffer and a decoded image buffer. The buffer is used to buffer reconstructed image blocks output by the reconstruction unit 305, and the decoded image buffer is used to buffer filtered image blocks output by the filter unit 306.

The decoding unit 301 is configured to perform decoding on coded image data to obtain quantized coefficients (for example, residual coefficients or transform coefficients). The decoding unit 301 is further configured to forward the decoded coding parameters to the prediction processing unit 304, so that the prediction processing unit enables to perform a prediction process according to the coding parameters.

The inverse quantization unit 302 is configured to perform the inverse quantization on the quantized coefficients to obtain inverse quantized coefficients. The inverse quantization is a reverse application of the quantization unit 204, for example, apply, based on or using a same quantization step size as the quantization unit 204, the inverse of a quantization solution applied by the quantization unit 204. The dequantized coefficients may also be referred to as dequantized residual coefficients or quantized transform coefficients.

The inverse transform processing unit 303 is configured to perform inverse transform on the aforementioned inverse quantization coefficients. It should be understood that the inverse transform is a reverse application of the above transform processing unit 203. For example, the inverse transform may include the inverse discrete cosine transform or the inverse discrete sine transform to obtain an inverse transform block in a pixel domain. (or sample domain). The inverse transform block may also be referred to as an inverse transform dequantized block or an inverse transform residual block.

The reconstruction unit 305 (for example, a summator) is configured to perform inverse transform (for example, inverse DCT, inverse integer transform, or conceptually similar inverse transform process) on the above-mentioned quantized coefficients to obtain an inverse transform block (also referred to as an inverse transform residual block). The inverse transform block is a residual block of the current image block in the pixel domain.

The prediction processing unit 304 is configured to receive or obtain coded image data (for example, the coded bit stream of the current image block) and reconstructed image data. The prediction processing unit 304 may also receive or obtain prediction related parameters and/or information about the selected prediction mode (that is, decoded coding parameters) from the decoding unit 301, and predict the current image block based on relevant data in the reconstructed image data and the decoded coding parameters to obtain a prediction block of the current image block.

The reconstruction unit 305 is configured to add the inverse transform block (that is, an inverse transform residual block) to the prediction block, for example, by adding sample values of the inverse transform residual block and the sample values of the prediction block, to obtain a reconstructed block in the sample domain.

The filter unit 306 is configured to filter the reconstructed block to obtain a filtered block. The filtered block is a decoded, image block.

Specifically, in the embodiment of the present disclosure, the decoding unit 301 is configured to implement the coefficient decoding method described in the following embodiments.

It should be understood that in the coder 20 and the decoder 30 of the embodiment of the present disclosure, the processing result for a certain stage may also be further processed and output to the next stage.

Figure 4:
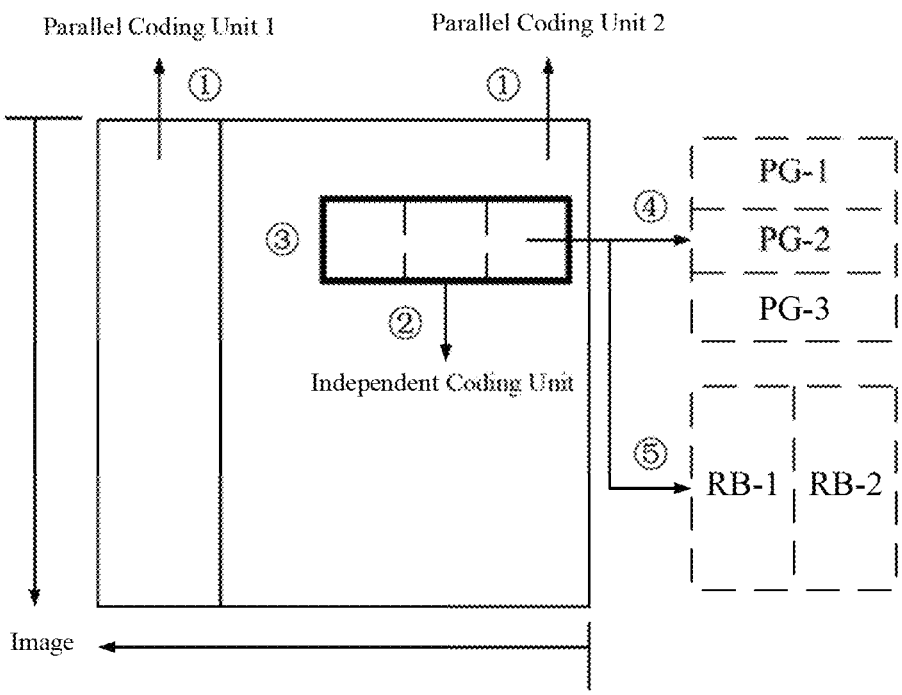
FIG. 4 is a schematic flowchart of a coding/decoding process according to an embodiment of the present disclosure.

Based on the coding and decoding system, the coder and the decoder shown in FIG. 1 to FIG. 3, the embodiment of the present disclosure provides a possible coding/decoding implementation method. As shown in FIG. 4, FIG. 4 is a schematic flowchart of a coding decoding process according to an embodiment of the present disclosure. The coding decoding implementation method includes process ① to process ⑤. Process ① to process ⑤ can be executed by any one or more of the source device 11, the decoder 20, the destination device 12 or decoder 30 described above.

Process ①: a frame of image is divided into one or more parallel coding units that do not overlap with each other. There is no dependency relationship between the one or more parallel coding units, and thus the one or more parallel coding units can be coded and decoded fully in parallel/independent, for example, a parallel coding unit 1 and a parallel coding unit 2 shown in FIG. 4.

Process ②: for each of the parallel coding units, the parallel coding unit can be further divided into one or more independent coding units that do not overlap with each other. The independent coding units can be independent of each other, but they can share some parallel coding unit header information.

For example, a width of each of the independent coding units is w_lcu, and a height of the independent coding unit is h_lcu. If the parallel coding unit is divided into one independent coding unit, a size of the independent coding unit is exactly the same as a size of the parallel coding unit; otherwise, the width of the independent coding unit should be greater than the height (unless it is an edge region).

In general, the independent coding unit can be a fixed w_lcu×h_lcu, where w_lcu and h_lcu are both the N-th power of 2 (N≥0), for example, the size of the independent coding unit is 128×4, 64×4, 32×4, 16×4, 8×4, 32×2, 16×2, or 8×2, or the like.

As a possible example, the independent coding unit can be a fixed 128×4. If the size of the parallel coding unit is 256×8, the parallel coding unit can be divided into four independent coding units; and if the size of the parallel coding unit is 288×10, the parallel coding unit can be divided into: the first/second row consists of two independent coding units of 128×4 and one independent coding unit of 32×4; and the third line consists of two 128×2 and one independent coding unit of 32×2.

It is worth noting that the independent coding unit can include three components, namely, luminance Y, chrominance Cb and chrominance Cr, or three components, namely, red (R), green (G) and blue (B), or only one of them. If the independent coding unit contains three components, the size of these three components can be exactly the same or different, which is related to the input format of the image.

Process ③: for each of the independent coding units, the independent coding unit can be further divided into one or more coding units that do not overlap with each other. Each of the coding units in the independent coding unit can depend on each other, for example, a plurality of coding units can perform mutual reference precoding.

If a size of the coding unit is the same as the size of the independent coding unit (that is, the independent coding unit is only divided into one coding unit), the size of the coding unit can be all the sizes described in process ②.

If the independent coding unit is divided into a plurality of coding units that do not overlap with each other, feasible division examples include: horizontal division (the height of the coding unit is the same as that of the independent coding unit, but the width of the coding unit is different from that of the independent coding unit, which can be ½, ¼, ⅛, 1/16, and the like), vertical division (the height of the coding unit is the same as that of the independent coding unit, but the height of the coding unit is different from that of the independent coding unit, which can be ½, ¼, ⅛, 1/16, and the like), and horizontal and vertical division (quadtree division), and the like, preferably, the horizontal division.

If a width of the coding unit is w_cu, and a height of the coding unit is h_cu, then the width of the coding unit should be greater than the height (unless it is an edge region). In general, the coding unit can be a fixed w_cu×h_cu, where w_cu and h_cu are both the N-th power of 2 (N is greater than or equal to 0), for example, 16×4, 8×4, 16×2, 8×2, 8×1, 4×1, and the like.

As a possible example, the coding unit may be a fixed 16×4. If the size of the independent coding unit is 64×4, the independent coding unit can be equally divided into four coding units; and if the size of the independent coding unit is 72×4, the coding units can be divided into four 16×4 and one 8×4.

It is worth noting that the coding unit can include three components, namely, luminance Y, chrominance Cb and chrominance Cr (or three components, namely, red R, green G, and blue B), or only one of them. If the coding unit contains three components, the dimensions of several components can be exactly the same or different, which is related to the input format of the image.

It is worth noting that process ③ is an optional step in the coding and decoding method, and the coder/decoder can code/decode the residual coefficients (or transform coefficients) of the independent coding units obtained in process ②.

Process ④: for the coding unit, the coding unit can be further divided into one or more prediction groups (PGs) that do not overlap with each other, PGs can also be referred to as Group, Each of the PGs codes and decodes according to a selected prediction mode to obtain a predicted value of the PG, which constitutes a predicted value of the whole coding unit. The residual value of the coding unit can be obtained based on the predicted value and an original value of the coding unit.

In process ④, the coding units are grouped by using a selected scanning manner. The scanning manner can include, but is not limited to, any one or more of the following: raster scanning, block scanning, horizontal scanning, vertical scanning, reciprocating (horizontal/vertical) scanning, diagonal (upper left, upper right, lower left, lower right) scanning, anti-diagonal scanning, anti-horizontal scanning, anti-vertical scanning, or the like.

Process ⑤: the coding unit can be grouped based on the residual value of the coding unit to obtain one or more residual blocks (RBs) that do not overlap with each other. Residual coefficients or transform coefficients of each of RBs are coded and decoded according to a selected mode to form a residual coefficient stream or a transform coefficient stream.

The selected mode of the coding and decoding method for the residual coefficients or the transform coefficients in the above process can include, but is not limited to, any or more of the following: unary code, truncated unary code, truncated binary code, fixed-length code, semi fixed-length code, run-length coding, k-order exponential Golomb coding, truncated Rice coding, Golomb-Rice coding, Huffman coding, arithmetic coding, adaptive variable length coding, and the like.

For example, the coder can directly code the coefficients within the RB.

For another example, the coder can also transform the residual block, for example, DCT, DST, Hadamard transform, and the like, and then code the transformed coefficients.

As a possible example, when the RB is relatively small, the coder can directly quantize all the coefficients within the RB, and then perform binary coding. If the RB is relatively large, the RB can be further divided into a plurality of coefficient groups (CGs), and then each of the CGs is quantized uniformly, and binary coding is performed. In some embodiments of the present disclosure, the coefficient group and the quantization group may be the same.

Hereinafter, taking a semi fixed-length code method as an example, the part of the residual coefficient coding will be exemplary illustrated. Firstly, a maximum absolute value of residual in an RB block is defined as a modified maximum (mm). Secondly, the number of coded bits for the residual coefficients in the RB block is determined (the number of the coded bits for the residual coefficients in the same RB block is consistent). For example, if a critical limit (CL) of the current RB block is 2, and the current residual coefficient is 1, it is necessary for the coding residual coefficient 1 to require 2 bits, which can be represented as 01. If the CL of the current RB block is 7, it means that residual coefficients of 7 bits and a sign bit of 1 bit are coded. The determination of the CL is to find a minimum coding length value that satisfies that all residuals in the current sub-block are within a range of $[-2^{\wedge}(\text{coding length}-1)-1, 2^{\wedge}(\text{coding length}-1)]$ and boundary values, the boundary value can be $-2^{\wedge}(\text{coding length}-1)$ or $2^{\wedge}(\text{coding length}-1)$. If there is a coefficient value with an absolute value of $2^{\wedge}(\text{coding length}-1)$ in the current RB block, a boundary symbol coding is added to the code stream, that is, it is necessary to determine whether the coefficient value $2^{\wedge}(\text{coding length}-1)$ in the current RB block is positive or negative according to the boundary symbol represented by the boundary symbol coding; and if none of the residuals exist in $-2^{\wedge}(\text{coding length}-1)$ and $2^{\wedge}(\text{coding length}-1)$, it is unnecessary to code the boundary symbol bit. If there is a coefficient value with an absolute value of $2^{\wedge}(\text{coding length}-1)$ in the coefficient group, a boundary symbol coding can be used to represent whether all the coefficients in the coefficient group are positive or negative.

In addition, for some special cases, the coder can also directly code the original value of the image instead of the residual value.

It should be noted that the prediction unit in the embodiment of the present disclosure can be the coding unit divided by the above process ③, or a prediction group further divided by the coding unit.

In combination with the schematic frame diagram of the coding and decoding system shown in FIG. 1, the coder shown in FIG. 2 and the decoder shown in FIG. 3 described above, the image coding method and coefficient decoding method involved in the present disclosure will be described in detail below.

Figure 5:
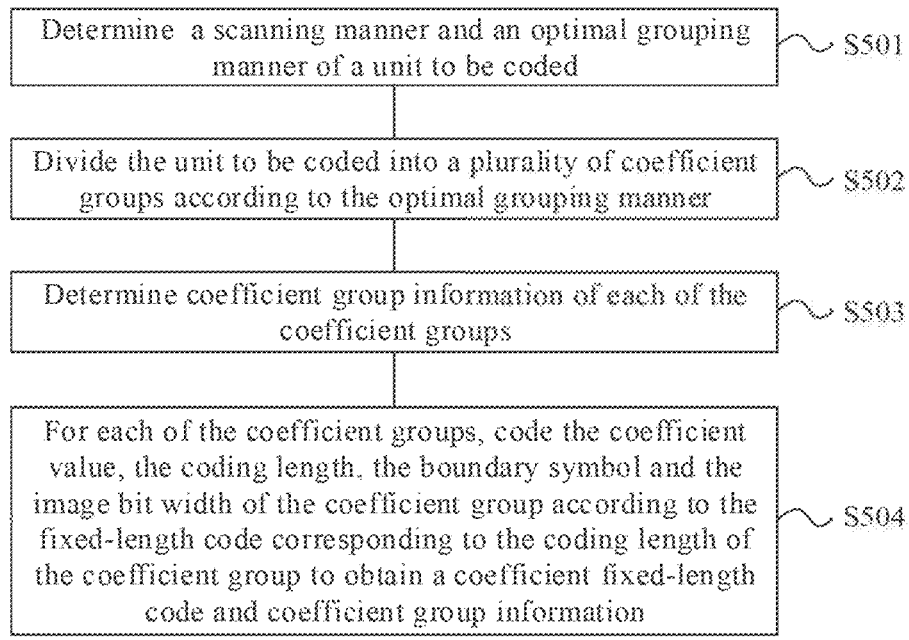
FIG. 5 is a schematic diagram of a coefficient coding method according to an embodiment of the present disclosure.

Firstly, the embodiment of the present disclosure provides a coefficient coding method, which can be applied to the coding unit 205. As shown in FIG. 5, the coefficient coding method can include S501 to S504.

S501, the coding unit 205 determines a scanning manner and an optimal grouping manner of a unit to be coded.

The scanning manner and the grouping manner of the unit to be coded described above can be obtained according to the agreement between the coding unit 205 and the decoding unit 301 in the coding and decoding consistency.

The optimal grouping manner can be determined according to the coding cost of each grouping manner. The coding cost can be calculated by using methods such as rate distortion optimation and minimizing rate distortion cost. The grouping manner with the lowest coding cost is the optimal grouping manner, that is, the coding with high frequency is as short as possible and the coding with low frequency is relatively long. Optionally, the optimal grouping manner can be obtained according to the agreement between the coding unit 205 and the decoding unit 301 in the coding and decoding consistency, or derived by decoding unit 301 according to the context (derived from the coded data, the residual coefficients or the coded parameters), or obtained by coding unit 205.

S502, the coding unit 205 divides the unit to be coded into a plurality of coefficient groups according to the optimal grouping manner.

The above scanning manner can be any one of the scanning manners, listed in process ⑤ of the coding/decoding implementation methods provided above, which will not be repeated here.

S503, the coding unit 205 determines coefficient group information of each of the coefficient groups.

Optionally, the coefficient group information can include a coding length, boundary symbols, and an image bit width corresponding to the coefficient group. The coding length corresponding to the coefficient group is used to represent that coefficient codes in the coefficient group are obtained by coding a fixed-length code of the coding length.

The image bit width (bit_depth) represents a maximum bit of the original data or the reconstructed data. According to the coding length and the image bit width corresponding to a coefficient group, it can be determined whether there is a coefficient value in the coefficient group that exceeds at fixed-length code value range of the coding length. If there is no coefficient value in the coefficient group that exceeds the fixed-length code value range of the coding length, it is unnecessary to set a boundary symbol for the coefficient group, that is, a coding range of the coefficient group is $[0, 2^{\wedge}\text{bit\_depth}-1]$. If there is a coefficient value in the coefficient group that exceeds the fixed-length code value range of the coding length, it is necessary to set the boundary symbol for the coefficient group, so that the coding range of the coefficient group is $[2^{\wedge}(\text{coding length}-1)-1, 2^{\wedge}(\text{coding length}-1)]$.

Optionally, if there is a boundary symbol in a coefficient group, the coefficient group can use the same boundary symbol to represent that all coefficient values in the coefficient group are positive or negative at the same time, that is, the coefficient group shares a boundary symbol.

In another embodiment, if there is a boundary symbol in a coefficient group, coefficient values whose absolute values are equal to the absolute extremum, that is, coefficient values equal to $2^{\wedge}(\text{coding length}-1)$ can use the same boundary symbol to represent that these coefficient values are both positive or negative, that is, these coefficient values with the absolute values equal to $2^{\wedge}(\text{coding length}-1)$ share a boundary symbol.

S504, for each of the coefficient groups, the coding unit 205 codes the coefficient value, the coding length, the boundary symbol and the image bit width of the coefficient group according to the fixed-length code corresponding to the coding length of the coefficient group to obtain a coefficient fixed-length code and coefficient group information.

It should be understood that when performing coefficient coding, there are different scanning manners according to different prediction modes, there are different grouping manners for different scanning manners, and thus there are different coefficient grouping situations, which correspond to different coefficient coding methods. Therefore, in addition to the coefficient coding method of S501 to S504 described above, the above-mentioned coefficient coding method of S501 to S504 can be adaptively refined or changed by one or more steps according to different coefficient grouping situations, and the specific embodiment of the coefficient coding method is not illustrated here, and the coding steps can be deduced reversely by referring to the specific embodiment of the coefficient decoding method below.

Figure 6:
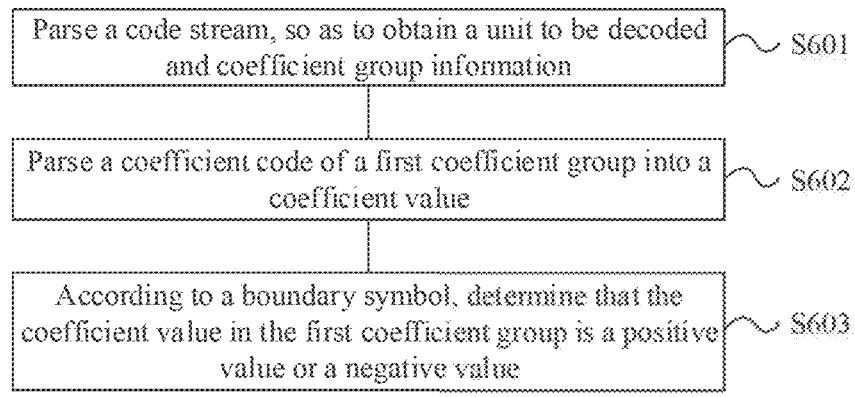
FIG. 6 is a schematic diagram of a coefficient decoding method according to an embodiment of the present disclosure.

For the coefficient coding method shown in FIG. 5, after the coding unit 205 completes the coefficient coding, the code stream is transmitted to the decoding unit 301. Correspondingly, the embodiment of the present disclosure provides a coefficient decoding method applied to the decoding unit 301. As shown in FIG. 6, the coefficient decoding method can include S601 to S603.

S601, the decoding unit 301 parses a code stream to obtain coefficient group information of a unit to be decoded.

The above-mentioned unit to be decoded includes one or more coefficient groups, each of the coefficient groups Includes one or more coefficient fixed-length codes, the coefficient group information includes one or more boundary symbols of the coefficient group, and the coefficient codes in the coefficient group are decoded by using fixed-length codes with a same coding length.

It should be understood that before parsing a coefficient group, it is necessary to extract the coefficient group from a unit to be decoded. In the embodiment, a scanning manner and a grouping manner corresponding to the unit to be decoded can be obtained by parsing a code stream, the unit to be decoded can be scanned according to the scanning manner to obtain scanning results, and the unit to be decoded is divided into one or more prediction groups according to the scanning results. Then, the scanning results are divided into one or more coefficient groups according to the grouping manner, and a first coefficient group is selected from the coefficient groups.

In another embodiment, before parsing a coefficient group, it is necessary to extract the coefficient group from a unit to be decoded. In the embodiment, a grouping manner corresponding to the unit to be decoded can be obtained by parsing a code stream, a prediction mode of the current coding unit can be obtained from the code stream, a scanning manner can be derived based on the prediction mode, the unit to be decoded can be scanned according to the scanning manner to obtain scanning results, and the unit to be decoded is divided into one or more prediction groups according to the scanning results. Then, the scanning results are divided into one or more coefficient groups according to the grouping manner, and a first coefficient group is selected from the coefficient groups.

S602, one or more coefficient codes in the first coefficient group are parsed into one or more coefficient values.

Optionally, in the embodiment, the coefficient codes can be parsed by selectin fixed-length codes with different coding lengths according to whether the coding length of the first coefficient group is smaller than to the image bit width of the first coefficient group. If the coding length is greater than or equal to the image bit width, the coefficient codes in the first coefficient group are parsed into the coefficient values by using fixed-length codes with a length equal to the image bit width; and if the coding length is smaller than the image bit width, the coefficient codes in the first coefficient group are parsed into the coefficient values by using fixed-length codes with a length equal to the coding length.

The coding length, the boundary symbol and the image bit width of the first coefficient group described above can all be obtained from the coefficient group information, which can be in a form of fixed-length code in the coefficient group information transmitted by the code stream, that is, a coding length code, a boundary symbol code and an image bit width code. The decoding unit 301 parses the coding length code, the boundary symbol code and the image bit width code of the first coefficient group by using a fixed-length coding decoding method or other decoding methods to obtain the coding length, the boundary symbol and the image bit width of the first coefficient group.

It should be understood that in the embodiment, in the process of parsing the coefficient codes in the coefficient group in S602, a run-length coding method can also be introduced to parse continuous zero values in the coefficient group, and the specific parsing method is the same as the existing run-length coding method, which will not be repeated here. At the same time, a skipping coefficient method can also be introduced. For example, if it is determined that a skipping coefficient mode is turned on after parsing the code stream, it is unnecessary for the whole group to code any coefficients, and the reconstructed value of decoding unit 301 is directly equal to the predicted value.

S603, it is determined whether the coefficient values in the first coefficient group are positive or negative according to the boundary symbols.

When the boundary symbols are not used, an analytical range of fixed-length codes 26, with the same length as the image bit width of the first coefficient group is $[0, 2^{\wedge}\text{bit\_depth}-1]$. When the boundary symbols are used, an analytical range of the fixed-length codes and the boundary symbols corresponding to the coding length of the first coefficient group is $[-2^{\wedge}(\text{coding length}-1)-1, 2^{\wedge}(\text{coding length}-1)]$.

Further, in the case that there is an absolute extremum in the first coefficient group, that is, in the case that there is a coefficient value with an absolute value equal to $2^{\wedge}(\text{coding length}-1)$ in the first coefficient group, the first coefficient group can share a boundary symbol, and the boundary symbol represents whether all coefficient values in the first coefficient group are positive or negative.

In another embodiment, when the parsed coefficient values are equal to the absolute extremum, these coefficients are coefficients located at the boundary, and symbols of the coefficients can be determined by the boundary symbols. For example, in the case that there is an absolute extremum in the first coefficient group, that is, in the case that there are coefficients with absolute values equal to 2^(coding length−1) in the first coefficient group, these coefficients can share a boundary symbol, that is, the boundary symbol represents whether the coefficients with the absolute values equal to 2^(coding length−1) are positive or negative.

Compared with the related art in the embodiment of the present disclosure, with the introduction of the boundary symbols, the analytical range of the coefficient values of semi fixed-length codes is changed from [0, 2^\bit_depth-1] to [−2^(coding length−1)−1, 2^(coding length−1)], thereby further shortening the overall coding length and improving the coding and decoding efficiency.

In an example, the first coefficient group can be further divided into a plurality of coefficient blocks, and coefficient codes in different coefficient blocks cannot share a boundary symbol. Therefore, there can be multiple boundary symbols in the code stream data, that is, the code stream includes the boundary symbol corresponding to each of the coefficient blocks, and each coefficient block shares a boundary symbol. For the same coefficient block, if the boundary symnbol code parsed in S603 is negative, the coefficient value with the parsed absolute value equal to 2^(coding length−1) in the coefficient block is −2^(coding length−1); and if the boundary symbol code parsed in S603 is positive, the coefficient value with the parsed absolute value equal to 2^(coding length−1) in the coefficient block is 2^(coding length−1). Optionally, the value obtained by parsing the boundary symbol code can be 0 representing negative or 1 representing positive, or 0 can be used to represent positive and 1 can be used to represent negative. The boundary symbol code is represented by one bit.

It should be noted that in the embodiment, after parsing one coefficient group in the unit to be decoded in S602-S603, it is necessary to parse other coefficient groups in the unit to be decoded in the same way as S602-S603 until all coefficient groups in the unit to be decoded are parsed, and the coefficient decoding of the unit to be decoded is completed at this time.

It should be understood that the coefficient decoding method provided by the embodiment can not only parse the coding of the transform coefficients or the residual coefficients, but also parse the coding of original pixel values according to the parsing, steps without introducing the boundary symbols.

An embodiment of the present disclosure provides a coefficient decoding method applied to residual coefficients in a point-by-point prediction mode. The method is applied to the decoding unit 301.

Figure 7:
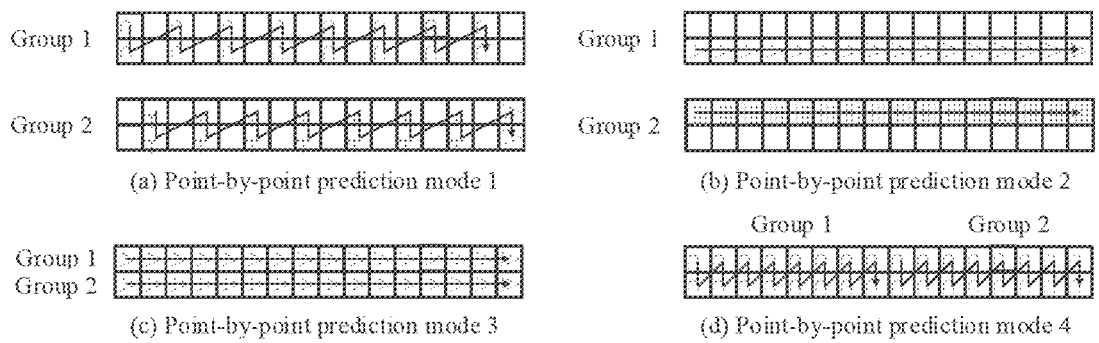
FIG. 7 is a schematic diagram of a scanning manner according to an embodiment of the present disclosure.

Firstly, how the decoding unit 301 determines the scanning manner and the grouping manner will be described. For the residual coefficients obtained by predicting the luminance Y using the point-by-point prediction mode, for example, a 16*2 pixel, block, the scanning manners can be a point-by-point prediction mode 1 shown in (a), a point-by-point prediction mode 2 shown in (b) a point-by-point prediction mode 3 shown in (c) and a point-by-point prediction mode 4 shown in (d) in FIG. 7. Group 1 is different from Group 2. In the point-by-point prediction mode 1, both Group 1 and Group 2 adopt a scanning order with vertical priority, that is, the scanning order from top to bottom and then from left to right. In point-by-point prediction mode 2, Group 1 and Group 2 successively adopt a scanning order with horizontal priority, that is, from left to right. In point-by-point prediction mode 3, Group 1 and Group 2 adopt a scanning order from left to right and then from top to bottom. In the point-by-point prediction mode 4, both Group 1 and Group 2 adopt a scanning order with vertical priority, that is, the scanning order from top to bottom and then from left to right.

Figure 8:
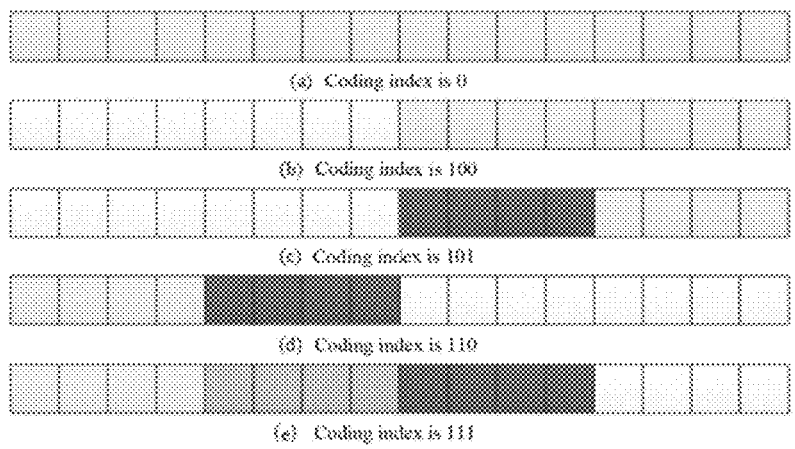
FIG. 8 is a schematic diagram of a grouping manner according to an embodiment of the present disclosure.

The unit to be decoded is scanned according to any of the above-mentioned scanning manners to obtain prediction groups Group 1 and Group 2, and each of the prediction groups is grouped. The grouping manner can be shown in FIG. 8, where each cell represents a coefficient fixed-length code, and different gray values represent different coefficient groups. FIG. 8(a) shows that the whole prediction group is regarded as a coefficient group of 16*1 when a coding index is 0, FIG. 8(b) shows that a prediction group is divided into two 8*1 coefficient groups in sequence when the coding index is 100, FIG. 8(c) shows that a prediction group is divided into an 8*1 coefficient group and two 4*1 coefficient groups in sequence when the coding index is 101, FIG. 8(d) shows that a prediction group is divided into two 4*1 coefficient groups and an 8*1 coefficient group in sequence when the coding index is 110, and FIG. 8(e) shows that a prediction group is divided into four 4*1 coefficient groups in sequence when the coding index is 111.

Figure 9:
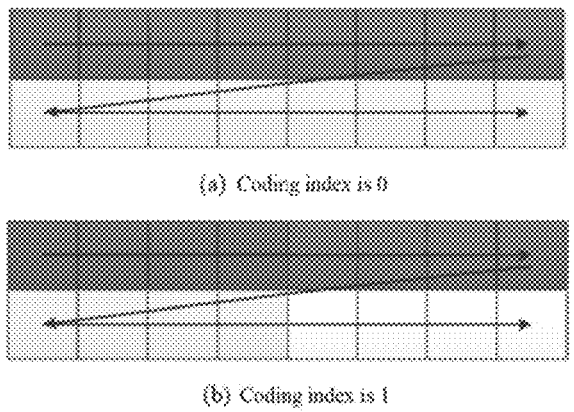
FIG. 9 is a schematic diagram of another scanning manner according to an embodiment of the present disclosure.

Step S602 will be described for the residual coefficients obtained by predicting chrominance Cb and chrominance Cr in the point-by-point prediction mode. For example, for an 8*2 pixel block, the scanning manner is horizontal scanning, that is, scanning line by line from left to right. As shown in FIG. 9(a), the unit to be decoded can be divided into two different prediction groups when the coding index of the scanning manner is 0: or as shown in FIG. 9(b), the unit to be decoded can be divided into four different prediction groups when the coding index of the scanning manner is 1. Each cell represents a coefficient fixed-length code, and different gray values represent different prediction groups, and in (b), the gray levels of the first four cells in a first line, the last four cells in the first line, the first four cells in a second line and the last four cells in the second line are different.

Figure 10:
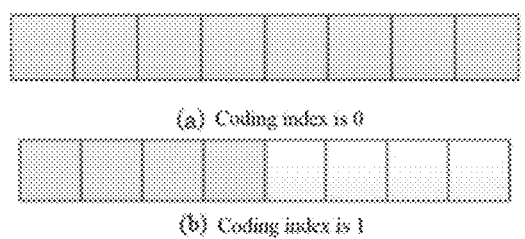
FIG. 10 is a schematic diagram of another grouping manner according to an embodiment of the present disclosure.

The unit to be decoded is scanned according to the above-mentioned scanning manner to obtain prediction groups, and each of the prediction groups is grouped. The grouping manner can be shown in FIG. 10, where each cell represents a coefficient fixed-length code, and different gray values represent different coefficient groups. FIG. 10(a) shows that the whole prediction group is regarded as an 8*1 coefficient group when the coding index is 0, and FIG. 10(b) that a prediction group is divided into two 4*1 coefficient groups in sequence when the coding, index is 1, where the gray levels of the first four cells are different from the gray levels of the last four cells.

After dividing the coefficient group according to the scanning manner and the grouping manner described above, the decoding unit 301 can determine the coding length corresponding to the coefficient group by first parsing the coding length code corresponding to the coefficient group by using a fixed-length code decoding method to obtain the coding length. Optionally, for the analysis of the coding length, a mixed method of the fixed-length code and the truncated unary code or other codes can also be used for parsing.

In S602, the decoding unit 301 parses the coefficient codes one by one according to the fixed-length codes corresponding to the coding length. If the coding length corresponding to the coefficient group is greater than or equal to the image bit width of the coefficient group, the coefficient codes are parsed by using the fixed-length codes corresponding to the coding length of the image bit width, and the analytical range is [0, 2^bit_depth−1]. If the coding length corresponding to the coefficient group is smaller than the image bit width of the coefficient group, the coefficient codes are parsed by using the fixed-length codes corresponding to the coding length.

In S603, the decoding unit 301 determines whether the coefficient values in the coefficient group are positive or negative according to the boundary symbols, so that the analytical range of the coefficient values is [−2^(coding length−1)−1, 2^(coding length−1)]. If there are one or more coefficient values with absolute values equal to 2^(coding length−1) in the coefficient group, all the coefficient values in the coefficient group have a common boundary symbol.

In another embodiment, in the case that there is an absolute extremum in the coefficient group, that is, in the case that there are coefficients with the absolute values equal to 2^(coding length−1) in the coefficient group, these coefficients can share a boundary symbol, that is, the boundary symbol represents whether the coefficients with the absolute values equal to 2^(coding length−1) are all positive or all negative.

Compared with the related art, in the embodiment of the present disclosure, by flexibly grouping the coefficients of luminance and chrominance in different ways, the applicability of coefficient decoding can be improved; and by introducing the boundary symbols to represent whether the analytical extremum of the fixed-length code corresponding to the coding length of the coefficient group is positive or negative, the coding and decoding efficiency can be improved. At the same time, considering the distribution of data, the scanning manner and the grouping manner make coefficients with similar amplitudes distributed in adjacent areas, so that the correlation between coefficient values of the divided coefficient group is preserved, thereby improving the decoding accuracy.

An embodiment of the present disclosure further provides a coefficient decoding method applied to residual coefficients in a non-point-by-point prediction mode. The method is applied to the decoding unit 301.

Figure 11:
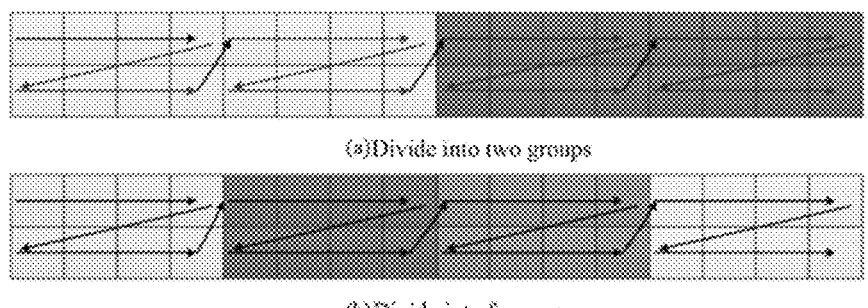
FIG. 11 is a schematic diagram of a scanning and grouping manner according to an embodiment of the present disclosure.

Firstly, the scanning mode and grouping mode are described. For the residual coefficients obtained by using the non-point-by-point prediction mode, for example, a 16*2 pixel block, the scanning order can be shown in arrow directions in (a) and (b) in FIG. 11. The division of the coefficient groups can be shown in different gray levels in (a) and (b) in FIG. 11, where each of the gray levels represents the same coefficient group.

After dividing the coefficient groups according to the scanning manner and the grouping manner described above, a method of determining the coding length corresponding to the coefficient group can be obtained by parsing the coding length code corresponding to the coefficient group by using Huffman coding.

In S602, when the coding length corresponding to the coefficient group is greater than or equal to the image bit width of the coefficient group, the decoding unit 301 parses the coefficient codes by using the fixed-length code corresponding to the coding length of the image bit width, and the analytical range is [0, 2^bit_depth−1]. When the coding length corresponding to the coefficient group is smaller than the image bit width of the coefficient group, the decoding unit 301 parses the coefficient codes by using the fixed-length code corresponding to the coding length.

In S603, the decoding unit 301 determines whether the coefficient values in the coefficient group are positive or negative according to the bound try symbols, so that the analytical range of the coefficient values is [−2^(coding length−1)−1, 2^(coding length−1)]. If there are one or more coefficient values with absolute values equal to 2^(coding length−1) in the coefficient group, a common boundary symbol is coded for the coefficient group.

In another embodiment, in the case that there is an absolute extremum in the coefficient group, that is, in the case that there are coefficients with the absolute values equal to 2^(coding length−1) in the coefficient group, these coefficients can share a boundary symbol, that is, the boundary symbol represents whether the coefficients with the absolute values equal to 2^(coding length−1) are all positive or all negative.

An embodiment of the present disclosure further provides a coefficient decoding method applied to transform coefficients in a non-point-by-point prediction mode. The method is applied to the decoding unit 301.

Figure 12:
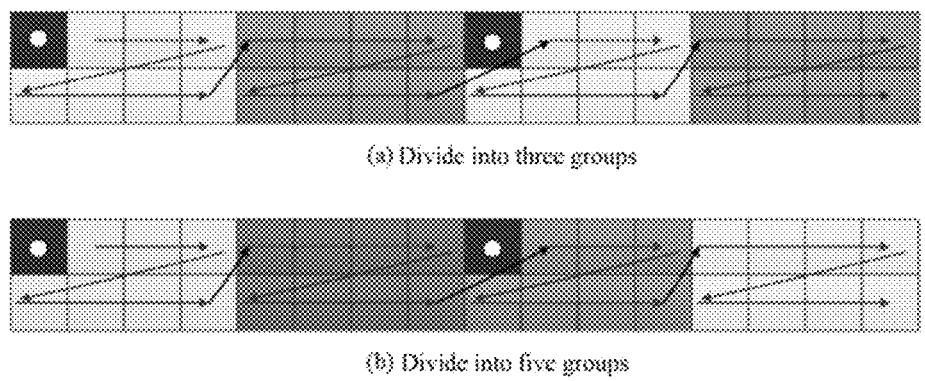
FIG. 12 is a schematic diagram of another scanning and grouping manner according to an embodiment of the present disclosure.

Firstly, the scanning mode and grouping mode are described. For the transform coefficients obtained by using the non-point-by-point prediction mode, for example, a 16*2 pixel block, the scanning order can be shown in arrow directions in (a) and (b) in FIG. 12. The division of the coefficient groups can be shown in different gray levels in (a) and (b) in FIG. 12. Each of the gray levels represents the sane coefficient group, a part containing dots represents direct current (DC) coefficients, all DC coefficients are divided into one DC coefficient group, and a part excluding dots is divided into one or more alternating current (AC) coefficients.

After dividing the coefficient groups according to the scanning manner and the grouping manner described above, a method of determining the coding length of the coefficient group corresponding to the fixed-length code can be obtained by parsing the coding length corresponding to the AC coefficient group by using Huffman coding, and parsing the coding length corresponding to the DC coefficient group by using the fixed-length code method.

In S602, when the coding length corresponding to the coefficient group is less than 7, the decoding unit 301 parses the coefficient codes by using a fixed-length code corresponding to a coding length of coding length. When the coding length corresponding to the coefficient group is greater than or equal to 7, the decoding unit 301 parses the coefficient codes by using a fixed-length code corresponding to the image bit width (bit_depth)+3.

In S603, the decoding unit 301 determines whether the coefficient values in the coefficient group are positive or negative according to the boundary symbols, so that the analytical range of the coefficient values is [−2^(coding length−1)−1, 2^(coding length−1)]. If there are one or more coefficient values with absolute values equal to 2^(coding length−1) in the coefficient group, a common boundary symbol is coded for the coefficient group.

In another embodiment, in the case that there is an absolute extremum in the coefficient group, that is, in the case that there are coefficients with the absolute values equal to 2^(coding length−1) in the coefficient group, these coefficients can share a boundary symbol, that is, the boundary symbol represents whether the coefficients with the absolute values equal to 2^(coding length−1) are all positive or all negative.

Compared with the related art, in the embodiment of the present disclosure, when coding the transform coefficients in the non-point-by-point prediction mode, by dividing the DC coefficients and the AC coefficients in the transform coefficients into different coefficient groups, and then coding the coefficient values, it can avoid using fixed-length codes with the same coding length for the DC coefficients with relatively low frequency and the AC coefficients with relatively high frequency in the same coefficient group, thereby improving coding efficiency.

In the same coefficient group, there may be a few (for example, one or two) coefficient values that exceed an average value of the coefficient group by a large amount due to grouping manners or coefficient types. For example, when the DC coefficients and AC coefficients are divided into the same coefficient group, the difference between the DC coefficients with the AC coefficients is relatively large; or when the predicted value is outside the predicted group obtained by scanning, the difference between the predicted value and the current pixel value may be relatively large. Therefore, an embodiment of the present disclosure further provides a coefficient decoding method, which is applied to the decoding unit 301. The coefficient decoding method adjusts the coding length of the fixed-length code corresponding to the coefficient values in the coefficient group, and coefficient values at different positions can be parsed by using fixed-length codes with different coding lengths. Compared with S601 to S603, the coefficient decoding method differs only in the steps of determining the coding length corresponding to the coefficient group and parsing the coefficients according to the fixed-length code of the coding length corresponding to the coefficient group, and the same parts will not be repeated here.

In an example, the step of determining the coding length corresponding to the coefficient group in S601 may be as follows.

Firstly, the decoding unit 301 parses a coding length coding length and a coding length additional value A corresponding to a fixed-length code of a coefficient group from a code stream.

The coding length additional value A may be a value A set by a coding unit 205 for one or more specific positions in the coefficient group where the coefficient value exceeds an average value of the coefficient group by a large amount. The value A is equal to a difference between coding lengths of fixed-length codes corresponding to coefficient values at the specific positions with the coding length of the fixed-length code corresponding to the coefficient group. For example, for the coding unit 301, if the largest coefficient value in the coefficient group is 9, the second largest coefficient value is 3, a coding length corresponding to the coefficient value 3 is 2, and a coding length corresponding to the coefficient value 9 is 4, then A=4−2=2.

Secondly, the decoding unit 301 determines one or more specific positions in the coefficient group.

The specific positions can be agreed by the coding unit 205 and the decoding unit 301 in coding consistency, or can be derived by the coding unit 301 according to context information. For example, if a certain position of a previous unit to be decoded is a specific position, then it is determined that a corresponding position of a current unit to be decoded is the specific position.

Then, the decoding unit 301 determines that the coding length of the fixed-length code corresponding to a specific position in the coefficient group is coding length+A, and the coding length of the fixed-length code corresponding to the coefficients other than the specific position is coding length.

The step of parsing the coefficients according to the fixed-length code of the coding length corresponding to the coefficient group can be to parse coefficient codes at specific positions by using a fixed-length code with a coding length of coding length+A, and to parse other coefficient codes except for the specific positions by using a fixed-length code of coding length.

In an example, in the embodiment, the following operations can also performed when the coding length corresponding to the coefficient group is relatively short. For example, a coding length threshold B is agreed by the coding unit 205 and the decoding unit 301 through coding consistency, and coefficient value range data C is carried in the code stream. The coefficient value range data C is used to represent whether an absolute value of a coefficient value is less than $2^{\wedge}(coding\ length-3)$.

The step of determining the coding length corresponding to the coefficient group in S601 can include: when the coding length is less than the coding length threshold B, the decoding unit 301 determines that coding lengths corresponding to all the coefficient codes in the coefficient group is coding length.

In S602, when the coding length is greater than or equal to the coding length threshold B, the decoding unit 301 determines whether the absolute value of each of the coefficient codes is less than $2^{\wedge}(coding\ length-3)$ according to the coefficient value range data C. If the absolute value of the coefficient code is less than $2^{\wedge}(coding\ length-3)$, the coefficient codes are parsed by using a fixed-length code corresponding to coding length−3; and if the absolute value of the coefficient code is not less than $2^{\wedge}(coding\ length-3)$, the coefficient codes are parsed by using the fixed-length code corresponding to coding length.

In an example, the coding length of the coefficient group can also be transformed into k-order exponential Golomb coding in the embodiment. For example, the coding unit 205 and the decoding unit 301 agree on a coding length threshold D through coding consistency.

The step of determining the coding length corresponding to the coefficient group in S601 can include: when the coding length of the coefficient group is less than the coding length threshold D, the decoding unit 301 determines that coding lengths corresponding to all the coefficient codes in the coefficient group is coding length. When the coding length of the coefficient group is greater than or equal to the coding length threshold D, the decoding unit 301 introduces k-order exponential Golomb coding with order k=(coding length−5) to obtain the coding lengths corresponding to the coefficient codes. A value of k can be derived from coding length by using other transformation methods. In the subsequent coefficient code parsing method in S602, the fixed-length codes of the coding lengths corresponding to the coefficient codes is still used for parsing, which will not be repeated here.

In an example, if a number of the coefficient codes in the coefficient group is relatively large, for example, when the number of the coefficient codes is greater than N, the step of determining the coding length corresponding to the coefficient group in S601 can include: the decoding unit 301 parses that a coding length of the coefficient group as coding length by using a fixed-length decoding method; and when the coding length is not equal to a preset value E, the coding length corresponding to all the coefficient codes in the coefficient group is coding length. When the coding length is equal to the preset value E, it is determined that the coefficient with a coefficient value being not greater than 0 in the coefficient group is 0, and it is determined that the coding length corresponding to the coefficient code at the position greater than 0 in the coefficient group is coding length. In an optional example, the preset value E can be 2, 3, and the like, and a value of N can be greater than 4.

It should be understood that in the embodiment, the coding lengths of the fixed-length codes corresponding to one or more coefficient codes at one or more positions in a coefficient group can be regarded as coefficient bit coding lengths, and code lengths of shared fixed-length codes corresponding to other positions in the coefficient group can be regarded as coefficient group coding lengths.

Compared with the related art, by changing the coding lengths corresponding to the coefficients in the coefficient group, and parsing different coefficient codes in the coefficient values by using the fixed-length codes corresponding to different coding lengths, coefficient codes at a certain position can be parsed by using the fixed-length code with a special coding length, and coefficient codes at other positions are still parsed by using the fixed-length code with a relatively short coding length, thereby reducing the overall coding length and improving the coding efficiency.

In addition to adjusting the coding length of the fixed-length code of the coefficient group, an embodiment of the present disclosure further provides a coefficient decoding method. The coefficient decoding method is applied to the decoding unit 301. By adjusting the coefficient values in the coefficient group during coding and restoring the coefficient values during decoding, the overall coding length of the coefficient values can be reduced. Compared with S601 to S603, the coefficient decoding method only differs in the step of parsing coefficients according to the fixed-length code of the coding length corresponding to the coefficient group, and the same parts will not be repeated here.

In an example, in the step of parsing coefficients according to the fixed-length code of the coding length corresponding to the coefficient group, the decoding unit 301 first parses all the coefficient values by using the fixed-length code of the code length corresponding to the coefficient group, and shifts the coefficient values for a specific position, that is, coefficient coefficient<<F. F is parsed by using a fixed-length coding and decoding method to obtain delda_coefficient, and delda_coefficient is added to the coefficient values obtained by parsing at all special positions in the coefficient group. The above-mentioned specific positions can be agreed by the coding unit 205 and the decoding unit 301 in coding consistency, or can be derived by the coding unit 301 according to context information. For example, if a certain position of a previous unit to be decoded is a specific position, then it is determined that a corresponding position of a current unit to be decoded is the specific position.

In an example, coefficient group information obtained by the decoding unit 301 through S601 includes a coding length threshold and a coefficient additional value G of the coefficient group. Hereinafter, the setting of the coding length threshold and coefficient additional value G will be explained. In the process of coefficient coding, if the coding length of fixed-length code corresponding to a certain coefficient value is longer than the coding length threshold of the coefficient group, the coding unit 205 will subtract the coefficient additional value G from the coefficient value and code the result of subtracting the coefficient additional value G from the coefficient value, where the coding length threshold and the coefficient additional value G can be flexibly set according to the specific size of the coefficient group. In the step of parsing the coefficients according to the fixed-length code of the coding length corresponding to the coefficient group, if the fixed-length code coding length is greater than the coding length threshold, the decoding unit 301 firstly parses the coding of the coefficient additional value G by using the fixed-length code with the coding length of coding length to obtain the coefficient additional value G, then paras all the coefficient values in the coefficient group by using the fixed-length code with the coding length of coding length, and adds all the coefficient values with the coefficient additional value G, thereby restoring the coefficient values.

Compared with the related art, the coefficient values in the coefficient group are adjusted during coding, and then the coefficients at specific positions in the coefficient group are restored during decoding based on parameters transmitted by the code stream. Therefore, it is unnecessary to carry a relatively long complete coefficient coding when transmitting the code stream, thereby improving the coding efficiency.

In addition to adjusting the coding length of the fixed-length code of the coefficient group and the coefficient values in the coefficient group, an embodiment of the present disclosure further provides a coefficient decoding method. The coefficient decoding method is applied to the decoding unit 301. During coding, the boundary symbols of the coefficient group are adjusted to further expand the decoding range through the boundary symbols.

In an example, the boundary symbols in coefficient group information can not only represent whether the absolute extremum in coefficient group is positive or negative with 1 bit, but also represent the coefficient compensation value n bits. In S603, after parsing the coefficient codes according to the fixed-length code with the coding length of coding length, for the position of the coefficient codes with the parsed absolute value equal to the absolute extremum of $2^{\wedge}(\text{coding length}-1)$, the coefficient compensation value is parsed from the boundary symbols, and the absolute extremum in coefficient group is added with the coefficient compensation value as a coefficient value at an absolute extremum position. Alternatively, the boundary symbols can also be used to represent whether the coefficient compensation value is positive or negative. It should be understood that if there are multiple absolute extremums in the same coefficient group, the coefficient compensation values can also be multiple, and the compensated coefficient values can be obtained by adding the absolute extremums to the corresponding coefficient compensation values respectively. It should be understood that in the embodiment, it is necessary for the decoding unit 301 to parse boundary symbol codes to obtain the boundary symbols, and the parsing method can be fixed-length decoding, truncated unary code. Huffman an decoding or a mixed decoding method of several common decoding methods.

Correspondingly, the embodiment of the present disclosure provides a coefficient decoding apparatus. The coefficient decoding apparatus can be, for example, any coefficient decoding apparatus during a call. The coefficient decoding apparatus may be divided into function modules according to the foregoing method examples. For example, the function modules may be divided corresponding to functions, or two or more than two functions may be integrated in a processing module. The integrated module may be implemented in a form of hardware, or may be implemented in a form of a software function module. It should be noted that module division in the embodiments of the present disclosure is an example and is merely logical function division. During actual implementation, there may be another division manner.

Figure 13:
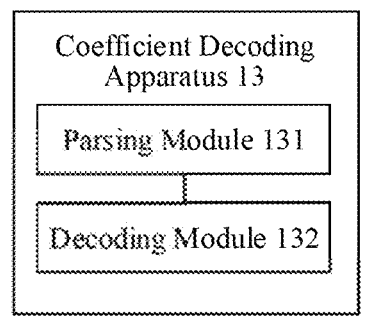
FIG. 13 is a schematic structural diagram of a coefficient decoding apparatus according to an embodiment of the present disclosure.

In the case of dividing the functional modules into corresponding functional modules, FIG. 13 shows a possible schematic structural diagram of the coefficient decoding apparatus involved in the above embodiment. As shown in FIG. 13, the coefficient decoding apparatus 13 includes a parsing module 131 and a decoding module 132.

In one embodiment, the above parsing module 131 is configured to obtain coefficient group information of a unit to be decoded. The coefficients of the unit to be decoded are divided into one or more coefficient groups, each of the coefficient groups includes one or more coefficient codes, the coefficient codes in a same coefficient group are fixed-length codes with a same coding length, the coefficient groups include a first coefficient group, and the coefficient group information includes one or more boundary symbols of the first coefficient group. The decoding module 132 is configured to parse one or more coefficient codes in the first coefficient group into one or more coefficient values, and is further configured to determine whether the coefficient values in the first coefficient group are positive or negative according to the boundary symbols.

Various modules of the above coefficient decoding apparatus can also be used to perform other actions in the embodiments of the above method. All relevant contents of the steps involved in the embodiments of the above method may be cited in functional descriptions of the corresponding functional modules, which will not be repeated here.

Figure 14:
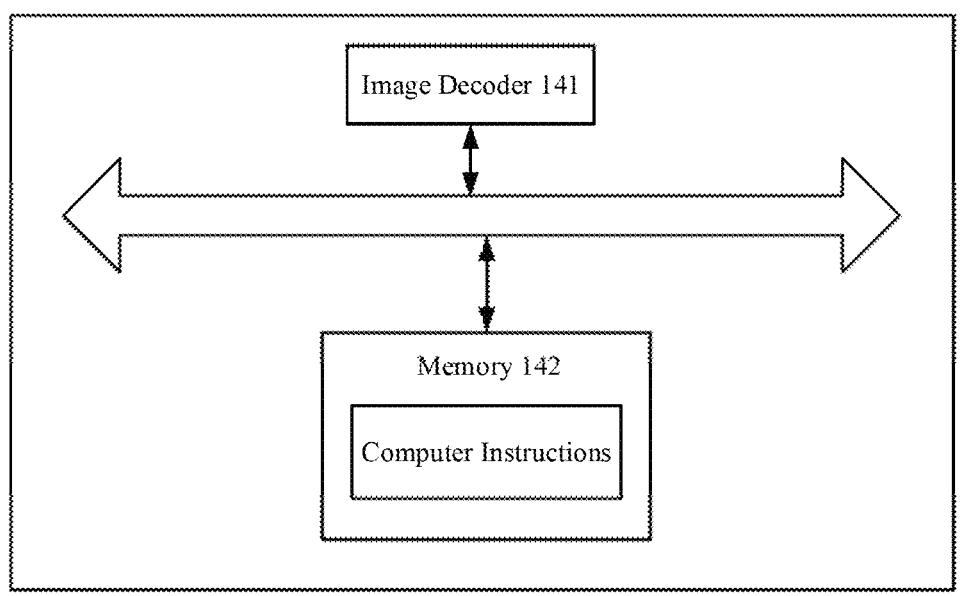
FIG. 14 is a hardware structure diagram of an electronic device according to an embodiment of the present disclosure.

FIG. 14 is a hardware structure diagram of an electronic device according to an embodiment of the present disclosure. As shown in FIG. 14, the electronic device may include an image decoder 141, a memory 142, and a communication interface (not shown). The memory 142 stores computer instructions that can be executed by the image decoder 141, and the image decoder 141 is used to execute the computer instructions to implement the methods disclosed in any of the above embodiments of the present disclosure.

All or some of the foregoing embodiments may be implemented by software, hardware, firmware, or any combination thereof. When a software program is used to implement the embodiments, all or some of the embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a magnetic disk, or a magnetic tape), an optical medium (for example, a digital video disc (DVD)), a semiconductor medium (for example, a solid state drive (SSD)), or the like.

Based on the foregoing descriptions of embodiments, a person skilled in the art may clearly understand that, for the purpose of convenient and brief description, division into the foregoing functional modules is used as an example for illustration. In actual application, the foregoing functions can be allocated to different modules and implemented based on a requirement, that is, an internal structure of an apparatus is divided into different functional modules to implement all or some of the functions described above. For a specific working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely at example. For example, division into the modules or units is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in a form of a software product. The computer software product is stored in a storage medium and includes several instructions for instructing a computer device (which may be a personal computer, a server, a network device, or the like) to perform all or some of the operations of the methods described in embodiments of the present disclosure. The foregoing storage medium includes any medium that can store program code, such as a flash memory, a removable hard disk, a read-only memory, a random access memory, a magnetic disk, or an optical disc.

The foregoing descriptions are merely embodiments of the present disclosure, but are not intended to limit the protection scope of the present disclosure. Any variation or replacement within the technical scope disclosed in the present disclosure shall fall within the protection scope of the present disclosure. Therefore, the protection scope of the present disclosure shall be subject to the protection scope of the claims.

The invention claimed is:

1. A coefficient decoding method, comprising:
    parsing a code stream to obtain coefficient group information of a unit to be decoded, wherein coefficients of the unit to be decoded are divided into one or more coefficient groups, each of the coefficient groups comprises one or more coefficient codes, the coefficient codes in a same coefficient group are fixed-length codes with a same coding length, the coefficient groups comprise a first coefficient group, and the coefficient group information comprises one or more boundary symbols of the first coefficient group;

parsing one or more coefficient codes in the first coefficient group into one or more coefficient values; and determining whether the coefficient values in the first coefficient group are positive or negative according to the boundary symbols;

wherein determining whether the coefficient values in the first coefficient group are positive or negative according to the boundary symbols comprises:

in response to an absolute extremum being in the first coefficient group, determining that symbols of coefficient values in the first coefficient group whose absolute values are equal to coefficients of the absolute extremum are all positive or all negative according to the boundary symbols, wherein the absolute extremum is the largest absolute value of a fixed-length code value range of the coding length.

2. The coefficient decoding method according to claim 1, wherein the coefficient group information further comprises a coding length and an image bit width of the first coefficient group, the coding length is used to represent a length of fixed-length codes corresponding to the first coefficient group, and parsing one or more coefficient codes in the first coefficient group into one or more coefficient values comprises:

in response to the coding length being greater than or equal to the image bit width, parsing the coefficient codes in the first coefficient group into the coefficient values by using fixed-length codes with a length equal to the image bit width; and in response to the coding length being smaller than the image bit width, parsing the coefficient codes in the first coefficient group into the coefficient values by using fixed-length codes with a length equal to the coding length.

3. The coefficient decoding method according to claim 1, wherein the first coefficient group comprises one or more coefficient blocks, the boundary symbols comprise a boundary symbol of each of the coefficient blocks, and determining whether the coefficient values in the first coefficient group are positive or negative according to the boundary symbols comprises:

for any one of the coefficient blocks, in response to an absolute extremum being in the coefficient block, determining that symbols of coefficient values in the coefficient block whose absolute values are equal to coefficients of the absolute extremum are all positive or all negative according to the boundary symbol of the coefficient block.

4. The coefficient decoding method according claim 1, wherein coefficients in the first coefficient group are residual coefficients, transform coefficients, or original pixel values.

5. The coefficient decoding method according to claim 4, wherein the coefficient groups comprise a direct current (DC) coefficient group and an alternating current (AC) coefficient group, and the first coefficient group is the DC coefficient group or the AC coefficient group.

6. The coefficient decoding method according to claim 5, wherein the coding length is in a form of a coding length code in the coefficient group information, and the boundary symbols are in a form of a boundary symbol code in the coefficient group information;

in response to the coefficient codes in the first coefficient group representing the transform coefficients and the first coefficient group being the DC coefficient group, the coefficient decoding method further comprises: parsing the coding length code by using a fixed-length code to obtain the coding length; parsing a DC coefficient value by using a fixed-length code with a length of the coding length and parsing the boundary symbol code by using a fixed coding length of 1 to obtain the boundary symbols.

7. The coefficient decoding method according to claim 4, further comprising:

determining a grouping manner of the unit to be decoded according to the code stream;

obtaining a prediction mode of a current coding unit from the code stream, and deriving a scanning manner according to the prediction mode;

scanning the unit to be decoded according to the scanning manner to obtain one or more scanning results; and extracting the first coefficient group from the scanning results according to the grouping manner.

8. An electronic device, comprising an image decoder, a communication interface and a memory, wherein the image decoder is configured to perform operations comprising:

parsing a code stream to obtain coefficient group information of a unit to be decoded, wherein coefficients of the unit to be decoded are divided into one or more coefficient groups, each of the coefficient groups comprises one or more coefficient codes, the coefficient codes in a same coefficient group are fixed-length codes with a same coding length, the coefficient groups comprise a first coefficient group, and the coefficient group information comprises one or more boundary symbols of the first coefficient group;

parsing one or more coefficient codes in the first coefficient group into one or more coefficient values; and determining whether the coefficient values in the first coefficient group are positive or negative according to the boundary symbols;

wherein determining whether the coefficient values in the first coefficient group are positive or negative according to the boundary symbols comprises:

in response to an absolute extremum being in the first coefficient group, determining that symbols of coefficient values in the first coefficient group whose absolute values are equal to coefficients of the absolute extremum are all positive or all negative according to the boundary symbols, wherein the absolute extremum is the largest absolute value of a fixed-length code value range of the coding length.

9. The electronic device according to claim 8, wherein the coefficient group information further comprises a coding length and an image bit width of the first coefficient group, the coding length is used to represent a length of fixed-length codes corresponding to the first coefficient group, and parsing one or more coefficient codes in the first coefficient group into one or more coefficient values comprises:

in response to the coding length being greater than or equal to the image bit width, parsing the coefficient codes in the first coefficient group into the coefficient values by using fixed-length codes with a length equal to the image bit width; and in response to the coding length being smaller than the image bit width, parsing the coefficient codes in the first coefficient group into the coefficient values by using fixed-length codes with a length equal to the coding length.

10. The electronic device according to claim 8, wherein the first coefficient group comprises one or more coefficient blocks, the boundary symbols comprise a boundary symbol of each of the coefficient blocks, and determining whether the coefficient values in the first coefficient group are positive or negative according to the boundary symbols comprises:

for any one of the coefficient blocks, in response to an absolute extremum being in the coefficient block, determining that symbols of coefficient values in the coefficient block whose absolute values are equal to coefficients of the absolute extremum are all positive or all negative according to the boundary symbol of the coefficient block.

11. The electronic device according to claim 8, wherein coefficients in the first coefficient group are residual coefficients, transform coefficients, or original pixel values.

12. The electronic device according to claim 11, wherein the coefficient groups comprise a direct current (DC) coefficient group and an alternating current (AC) coefficient group, and the first coefficient group is the DC coefficient group or the AC coefficient group.

13. The electronic device according to claim 12, wherein the coding length is in a form of a coding length code in the coefficient group information, and the boundary symbols are in a form of a boundary symbol code in the coefficient group information;

in response to the coefficient codes in the first coefficient group representing the transform coefficients and the first coefficient group being the DC coefficient group, the operations further comprise: parsing the coding length code by using a fixed-length code to obtain the coding length; parsing a DC coefficient value by using a fixed-length code with a length of the coding length and parsing the boundary symbol code by using a fixed coding length of 1 to obtain the boundary symbols.

14. The electronic device according to claim 11, further comprising:

determining a grouping manner of the unit to be decoded according to the code stream;

obtaining a prediction mode of a current coding unit from the code stream, and deriving a scanning manner according to the prediction mode;

scanning the unit to be decoded according to the scanning manner to obtain a scanning result; and extracting the first coefficient group from the scanning result according to the grouping manner.

15. A non-transitory computer-readable storage medium comprising computer instructions, wherein when the computer instructions are run on an electronic device, the electronic device is enabled to perform operations comprising:

parsing a code stream to obtain coefficient group information of a unit to be decoded, wherein coefficients of the unit to be decoded are divided into one or more coefficient groups, each of the coefficient groups comprises one or more coefficient codes, the coefficient codes in a same coefficient group are fixed-length codes with a same coding length, the coefficient groups comprise a first coefficient group, and the coefficient group information comprises one or more boundary symbols of the first coefficient group;

parsing one or more coefficient codes in the first coefficient group into one or more coefficient values; and determining whether the coefficient values in the first coefficient group are positive or negative according to the boundary symbols;

wherein determining whether the coefficient values in the first coefficient group are positive or negative according to the boundary symbols comprises:

in response to an absolute extremum being in the first coefficient group, determining that symbols of coefficient values in the first coefficient group whose absolute values are equal to coefficients of the absolute extremum are all positive or all negative according to the boundary symbols, wherein the absolute extremum is the largest absolute value of a fixed-length code value range of the coding length.

16. The storage medium according to claim 15, wherein the coefficient group information further comprises a coding length and an image bit width of the first coefficient group, the coding length is used to represent a length of fixed-length codes corresponding to the first coefficient group, and parsing one or more coefficient codes in the first coefficient group into one or more coefficient values comprises:

in response to the coding length being greater than or equal to the image bit width, parsing the coefficient codes in the first coefficient group into the coefficient values by using fixed-length codes with a length equal to the image bit width; and in response to the coding length being smaller than the image bit width, parsing the coefficient codes in the first coefficient group into the coefficient values by using fixed-length codes with a length equal to the coding length.

17. The storage medium according to claim 15, wherein the first coefficient group comprises one or more coefficient blocks, the boundary symbols comprise a boundary symbol of each of the coefficient blocks, and determining whether the coefficient values in the first coefficient group are positive or negative according to the boundary symbols comprises:

for any one of the coefficient blocks, in response to an absolute extremum being in the coefficient block, determining that symbols of coefficient values in the coefficient block whose absolute values are equal to coefficients of the absolute extremum are all positive or all negative according to the boundary symbol of the coefficient block.

18. The storage medium according to claim 15, wherein coefficients in the first coefficient group are residual coefficients, transform coefficients, or original pixel values.

19. The coefficient decoding method according to claim 18, wherein the coefficient groups comprise a direct current (DC) coefficient group and an alternating current (AC) coefficient group, and the first coefficient group is the DC coefficient group or the AC coefficient group.

20. The storage medium according to claim 19, wherein the boundary symbols are in a form of a boundary symbol code in the coefficient group information; and the operations further comprise: parsing the boundary symbol code by using a fixed coding length of 1 to obtain the boundary symbols.

* * * * *